US011278810B1

(12) United States Patent
Sarria, Jr. et al.

(10) Patent No.: US 11,278,810 B1
(45) Date of Patent: Mar. 22, 2022

(54) MENU PLACEMENT DICTATED BY USER ABILITY AND MODES OF FEEDBACK

(71) Applicant: Sony Interactive Entertainment Inc., Tokyo (JP)

(72) Inventors: Mario M. Sarria, Jr., San Mateo, CA (US); Warren Benedetto, Foothill Ranch, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/220,689

(22) Filed: Apr. 1, 2021

(51) Int. Cl.
  *A63F 13/57* (2014.01)
  *A63F 13/53* (2014.01)
  *G06T 3/20* (2006.01)

(52) U.S. Cl.
  CPC .............. *A63F 13/57* (2014.09); *A63F 13/53* (2014.09); *G06T 3/20* (2013.01)

(58) Field of Classification Search
  CPC ........ A63F 13/57; A63F 13/53; A63F 13/533; A63F 2300/64; A63F 2300/66; A63F 2300/6653; A63F 2300/6661; A63F 2300/6684; G06T 3/20
  USPC .......................................................... 463/31
  See application file for complete search history.

(56) References Cited

U.S. PATENT DOCUMENTS

| 9,348,141 | B2* | 5/2016 | Bar-Zeev | ................ G06F 3/013 |
| 10,256,859 | B2* | 4/2019 | Fei | ........................ G06T 19/003 |
| 10,645,376 | B2* | 5/2020 | Chen | ..................... H04N 13/398 |
| 2018/0004289 | A1* | 1/2018 | Wilson | ..................... G06F 3/013 |
| 2019/0250773 | A1* | 8/2019 | Miyaki | ..................... A63F 13/25 |
| 2020/0209958 | A1* | 7/2020 | Sztuk | .................. G06F 3/04842 |
| 2020/0289937 | A1* | 9/2020 | Osman | .................. A63F 13/355 |

* cited by examiner

*Primary Examiner* — Allen Chan
(74) *Attorney, Agent, or Firm* — Penilla IP, APC

(57) ABSTRACT

Methods and systems are provided for placing or moving a virtual menu (e.g., virtual object) to an adjusted virtual position within a virtual reality scene based on the ability of a user. The method includes capturing, by a computing system, head mounted display (HMD) gameplay by a user of a video game being executed on the computing system. The HMD presents virtual reality scene to the user. The method includes monitoring, by the computing system, physical actions of the user while the user is wearing the HMD and interacting with the virtual reality scene during the gameplay. The method includes identifying, by the computing system, an attempt by the user to make an input at a virtual object in the virtual reality scene based on the physical actions. The method includes generating, by the computing system, a movement of the virtual object from an initial virtual position in the virtual reality scene to an adjusted virtual position in the virtual reality scene. The movement has a virtual distance and a virtual direction that is predicted for the user based a model of interactivity of the user to enable said input with the virtual object. In this way, a virtual menu (e.g., virtual object) is dynamically placed or moved to a virtual position in the virtual reality scene that can be accessible by the user.

22 Claims, 18 Drawing Sheets

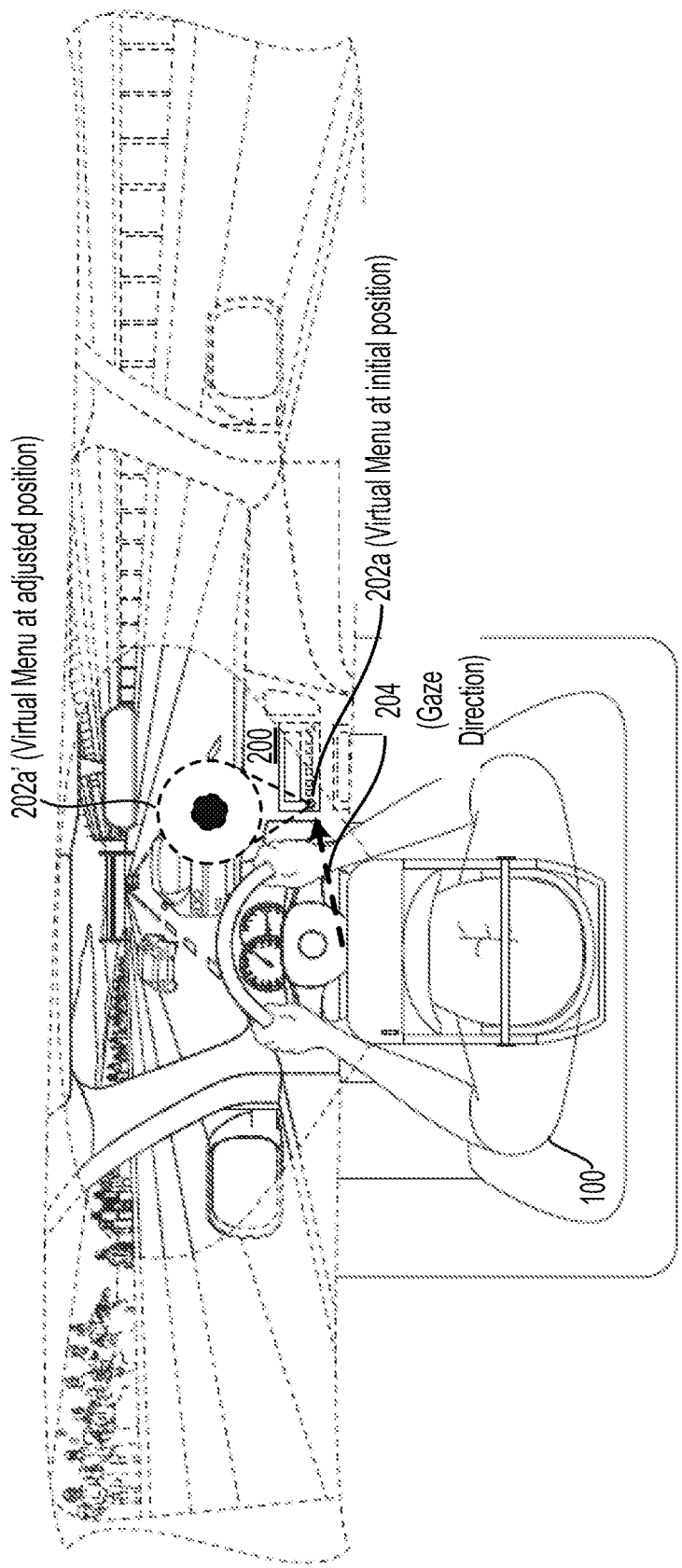

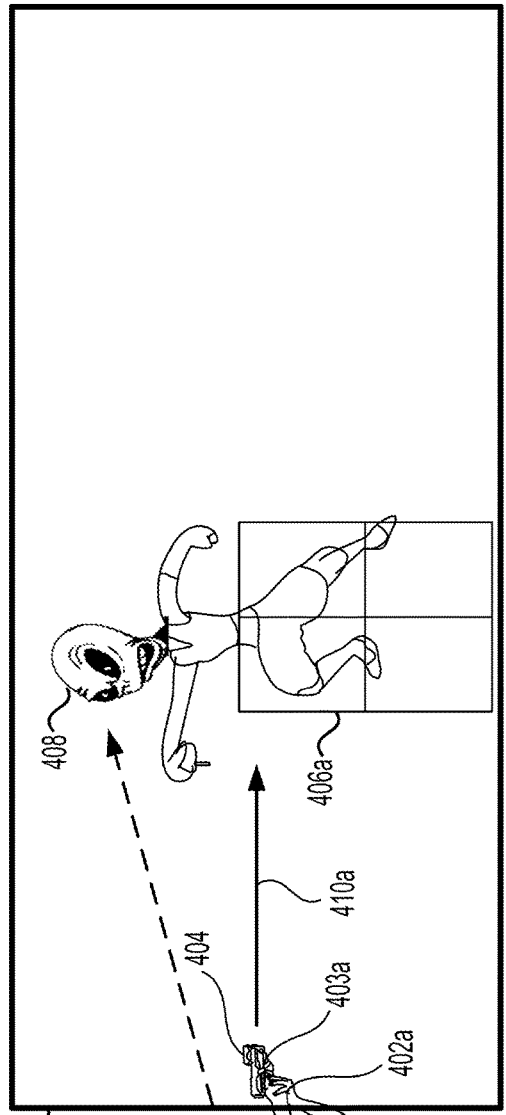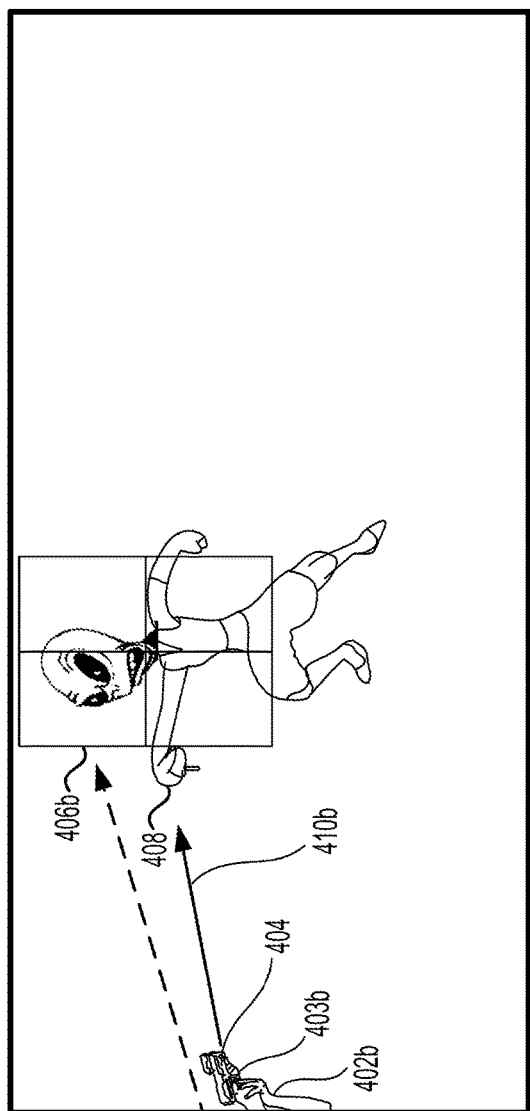

User Captured Physical Actions Table

| Physical Action Category | General Description |
|---|---|
| Body Movement data | Hand movement, head movement, body range of motion, reach direction, reach distance, body language gestures, attempted movement |
| Eye gaze data | Gaze direction, view location, game content |
| Voice capture data | Voice inflection, voice intensity, emotion, mood, sentiment |
| Face Capture data | Intensity, emotion, mood, sentiment, gestures |
| Controller input data | Intensity, emotion, mood, sentiment, gestures |

FIG. 5B

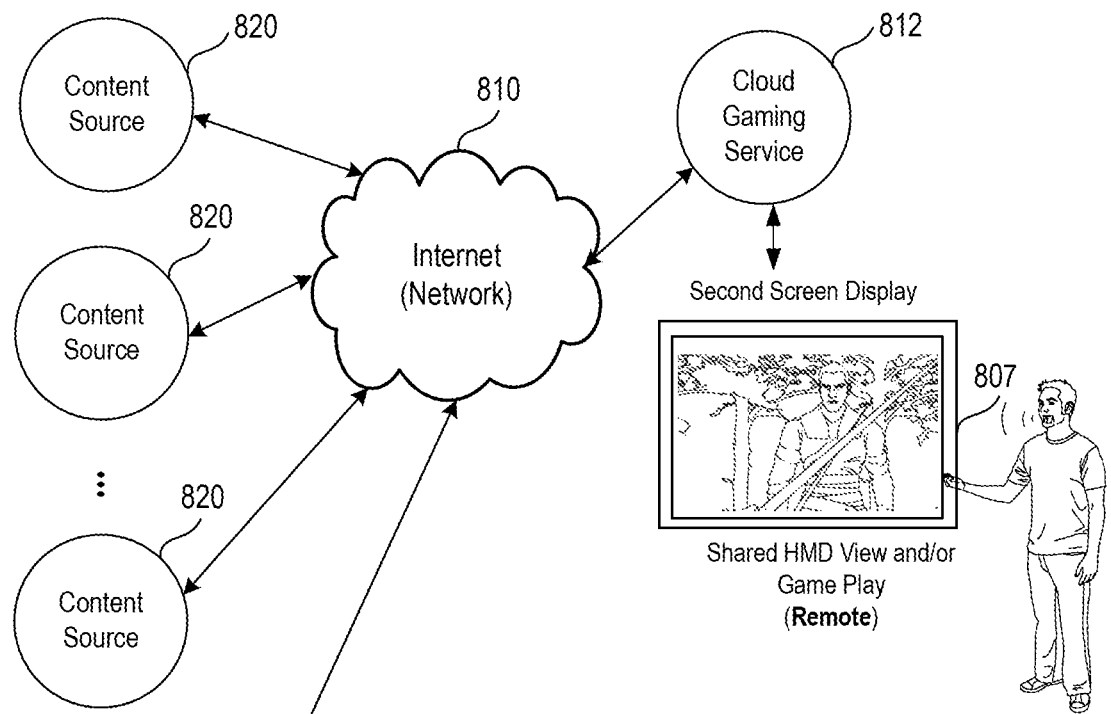
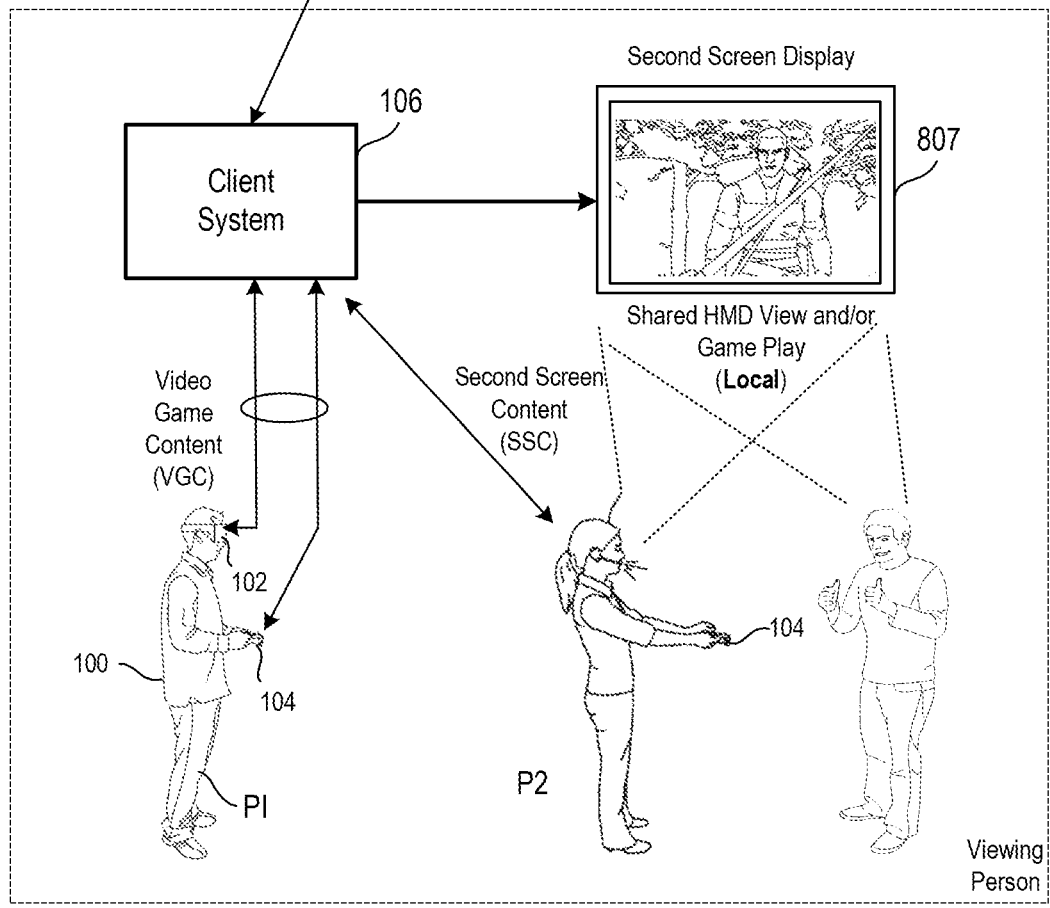
FIG. 8B

MENU PLACEMENT DICTATED BY USER ABILITY AND MODES OF FEEDBACK

BACKGROUND

1. Field of the Disclosure

The present disclosure relates generally to placing a virtual menu in a virtual position of a virtual reality scene, and more particularly to methods and systems for placing or moving a virtual menu within the virtual reality scene based on the ability of a user.

2. Description of the Related Art

The video game industry has seen many changes over the years. In particular, the virtual reality (VR) gaming industry has seen a tremendous growth over the years and is expected to continue growing at a compound annual growth rate. Consequently, as VR gaming continue to grow in popularity, there has been a tremendous growth in the number of current and existing gamers who are beginning play VR video games in order to take advantage of the unique experience that VR gaming provides.

A growing trend in the VR gaming industry is to improve and develop unique ways that will enhance the experience of VR gaming. For example, during gameplay of a user and when the user is immersed in the VR environment, the user can make various of body movements during their interaction with the VR game, e.g., hand movement, finger movement, arm movement, leg movement, etc. In certain cases, a user may be required to make specific body motions in order to perform the game action, e.g., lifting arm above shoulder to shoot a target, squatting to avoid an attack, pointing at virtual object to select a menu. Unfortunately, some users may have difficulty moving their body in certain directions and may not be able to successfully perform certain game actions during their gameplay. As a result, users may not be able to successfully perform certain game actions which may result in the user feeling frustrated and not wanting to continue with their gameplay.

It is in this context that implementations of the disclosure arise.

SUMMARY

Implementations of the present disclosure include methods, systems, and devices relating to placing or moving a virtual menu to an adjusted virtual position within a virtual reality scene based on the ability of a user. In some embodiments, methods are disclosed to that enable a virtual menu of a virtual reality (VR) video game to be placed or moved to an adjusted virtual position based on the physical actions of a head mounted display (HMD) user playing the VR video game. For example, a user playing a VR video game may be immersed in the VR environment of the VR game. During the gameplay of the user, the user may be required to make an input at a virtual menu which may require the user to move their arm and point at the virtual menu the provide an input. Unfortunately, users with a limited range of motion because of an injury, being sore from exercising, or having a lack of flexibility or ability will be unable to move their arm in certain directions to make a desired input.

Thus, instead of requiring the user to move their arms (or other body part) in a certain direction in order to make an input at the virtual menu, the methods disclosed herein outline ways of moving the virtual menu from an initial virtual position in the virtual reality scene to an adjusted virtual position in the virtual reality scene based on the ability of a user. In this way, users with a limited range of motion can provide input at the virtual menu since the adjusted virtual position is at a position that is accessible by the user. Thus, during the gameplay, users with a limited range of motion can seamlessly provide input into the video game without having to overexert themselves or risking further injury. In some embodiments, moving the virtual menu to an adjusted virtual position is predicted for the user based on a model of interactivity of the user. In one embodiment, the model of interactivity can use as inputs the physical actions of the user, context of the gameplay, and a profile associated with the user to predict the location for the placement of the virtual menu.

In one embodiment, a computer-implemented method is provided. The method includes capturing, by a computing system, head mounted display (HMD) gameplay by a user of a video game being executed on the computing system. The HMD presents virtual reality scene to the user. The method includes monitoring, by the computing system, physical actions of the user while the user is wearing the HMD and interacting with the virtual reality scene during the gameplay. The method includes identifying, by the computing system, an attempt by the user to make an input at a virtual object in the virtual reality scene based on the physical actions. The method includes generating, by the computing system, a movement of the virtual object from an initial virtual position in the virtual reality scene to an adjusted virtual position in the virtual reality scene. The movement has a virtual distance and a virtual direction that is predicted for the user based a model of interactivity of the user to enable said input with the virtual object. In this way, a virtual menu (e.g., virtual object) is dynamically placed or moved to a virtual position in the virtual reality scene that can be accessible by the user.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 2A-1 illustrates an embodiment of a view into a virtual environment of a user showing a virtual menu that is moved from an initial virtual position to an adjusted virtual position, in accordance with implementations of the disclosure.

FIG. 2A-2 illustrates an embodiment of the virtual environment of user shown in FIG. 2A-1 illustrating the user providing an input at the virtual menu, in accordance with implementations of the disclosure.

FIG. 2B-1 illustrates another embodiment of a view into a virtual environment of a user showing a virtual menu that is moved from an initial virtual position to an adjusted virtual position, in accordance with implementations of the disclosure.

FIG. 2B-2 illustrates an embodiment of the virtual environment of user shown in FIG. 2B-1 illustrating the user providing an input at the virtual menu, in accordance with implementations of the disclosure.

FIG. 4A illustrates an embodiment of a view into a virtual environment of a user showing the user interacting with a virtual reality scene while wearing an HMD, in accordance with implementations of the disclosure.

FIG. 4B illustrates an embodiment of the virtual environment of user shown in FIG. 4A showing the user interacting with the virtual reality scene where the virtual arm and virtual hand of the user are rendered at an adjusted position to assist the user aim at the intended target location, in accordance with implementations of the disclosure.

FIG. 5B illustrates an embodiment of a user captured physical actions table illustrating various physical actions that are captured during the gameplay of the user, in accordance with implementations of the disclosure.

FIGS. 8A-1 and 8A-2 illustrate a head-mounted display (HMD), in accordance with an implementation of the disclosure.

FIG. 8B illustrates one example of an HMD user interfacing with a client system, and the client system providing content to a second screen display, which is referred to as a second screen, in accordance with an implementation of the disclosure.

DETAILED DESCRIPTION

Figure 1A:
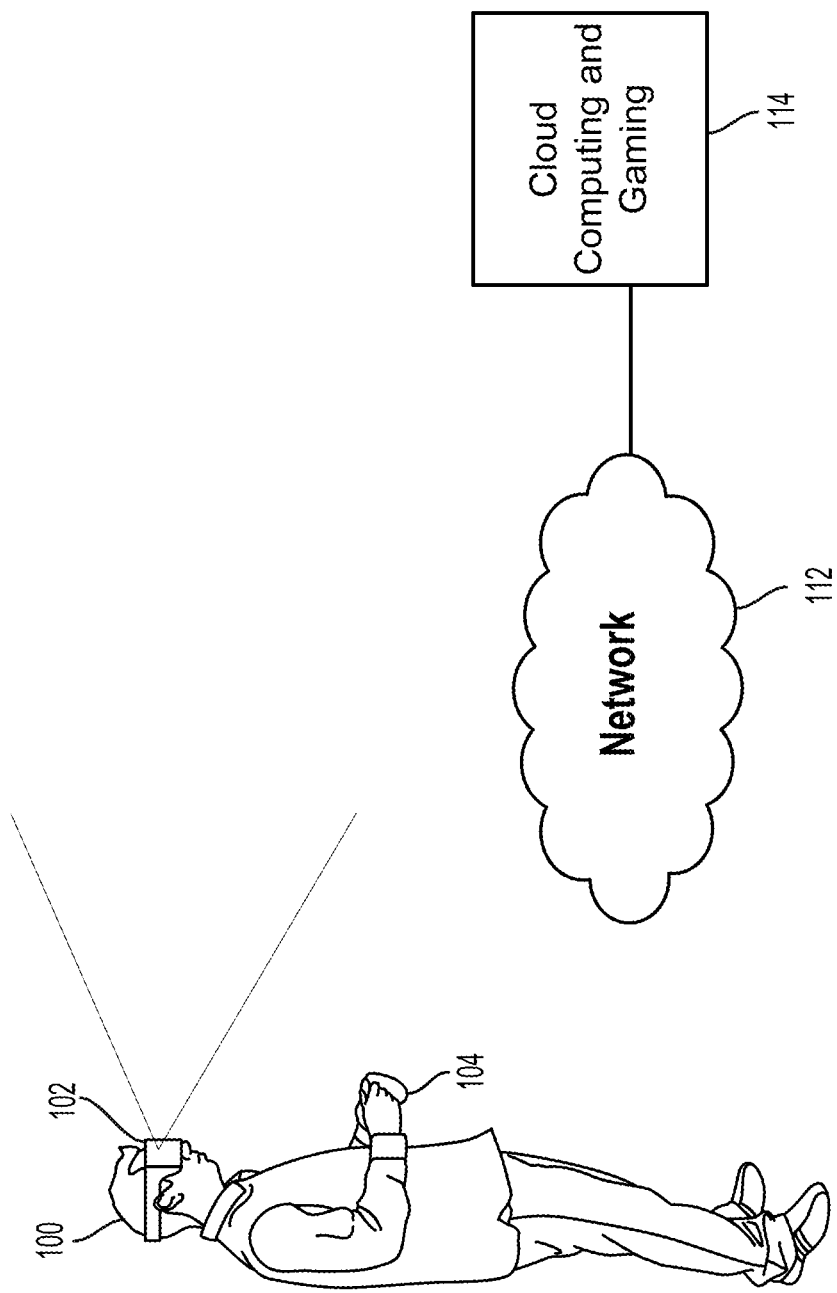
FIG. 1A illustrates an embodiment of a system for interaction with a virtual environment via a head-mounted display (HMD, in accordance with an implementation of the disclosure.

The following implementations of the present disclosure provide methods, systems, and devices for placing or moving a virtual menu in a virtual reality scene for a Head Mounted Display (HMD) user playing a virtual reality (VR) video game. In particular, during the gameplay of the user, a virtual menu associated with a virtual reality scene of the gameplay can be dynamically placed or moved to a virtual position within the virtual reality scene based on the ability of the user. As used herein the term "virtual menu" should be broadly understood to refer to a virtual object in a virtual realty scene that the user can provide input. Accordingly, the dynamic placement or movement of the virtual menu facilitates an enhanced and improved gaming experience for a user since the virtual menu can be moved to a virtual position within the VR scene based on the ability or preferred location of the user. In turn, this can enhance the gaming experience for users who may have difficulties accessing virtual menus that are located beyond their reach.

By way of example, in one embodiment, a method is disclosed that enables placing or moving a virtual menu in a virtual reality scene based on the ability of a user. The method includes capturing, by a computing system, HMD gameplay by a user of a video game being executed on the computing system. In one example, the HMD presents virtual reality scene to the user. In one embodiment, the method may further include monitoring, by the computing system, the physical actions of the user while the user is wearing the HMD and interacting with the virtual reality scene during the gameplay. In another embodiment, the method may include identifying, by the computing system, an attempt by the user to make an input at a virtual menu in the virtual reality scene based on the physical actions of the user. In some embodiments, the method includes generating, by the computing system, a movement of the virtual object from an initial virtual position in the virtual reality scene to an adjusted virtual position in the virtual reality scene. In one example, the movement has a virtual distance and a virtual direction that is predicted for the user based a model of interactivity of the user to enable the input with the virtual object. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for placing or moving a virtual menu within a virtual reality scene for a user playing a VR video game. For example, a user may be playing a VR video game using an HMD that is connected to a cloud computing and gaming provider over a network. While viewing and interacting with 3D interactive content through the display of the HMD, the physical actions of the user can be monitored by the system.

In one embodiment, the physical actions of the user may include various actions associated with the user during the gameplay such as voice output of the user, gaze of the user, body movement of the user, gesture of the user, etc. For example, during the gameplay of a user, the system may determine that based on the physical actions of the user, the range of motion of the user's arms are limited and that the user is unable to raise their arm above their shoulder. In some embodiments, when the user attempts to make an input at a virtual menu that is beyond the user's range of motion (e.g., above their shoulder), the system can generate a movement of the virtual menu from its initial virtual position to an adjusted virtual position that can be accessible by the user.

In some embodiments, the movement of the virtual menu to the adjusted virtual position is predicted for the user based on a model of interactivity of the user. In one embodiment, the model of interactivity of the user can receive as inputs a profile of the user, physical actions of the user, and gameplay data to predict the adjusted virtual position of the virtual menu. In this way, the virtual menu is moved to a location that can be accessible by the user or at a preferred location of the user. This facilitates a seamless way for users with a limited range of motion to continue with their gameplay without interruptions arising because of a virtual menu being located beyond the user's range of motion.

With the above overview in mind, the following provides several example figures to facilitate understanding of the example embodiments.

FIG. 1A illustrates an embodiment of a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD.

As illustrated in FIG. 1A, a user 100 is shown wearing an HMD 102 and operating an interface object 104 to provide input for the video game. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective. In the illustrated implementation, the HMD 102 is wirelessly connected to a cloud computing and gaming provider 114 over a network 112.

In one embodiment, the cloud computing and gaming provider 114 maintains and executes the video game being played by the user 102. In some embodiments, the cloud computing and gaming provider 114 is configured to receive inputs from the HMD 102 and the interface object 104 over the network 112. The cloud computing and gaming provider 114 is configured to process the inputs to affect the game state of the executing video game. The output from the executing video game, such as video data, audio data, and haptic feedback data, is transmitted to the HMD 102 and the interface object 104. For example, video and audio streams are provided to the HMD 102, whereas a haptic/vibration feedback command is provided to the interface object 104.

Figure 1B:
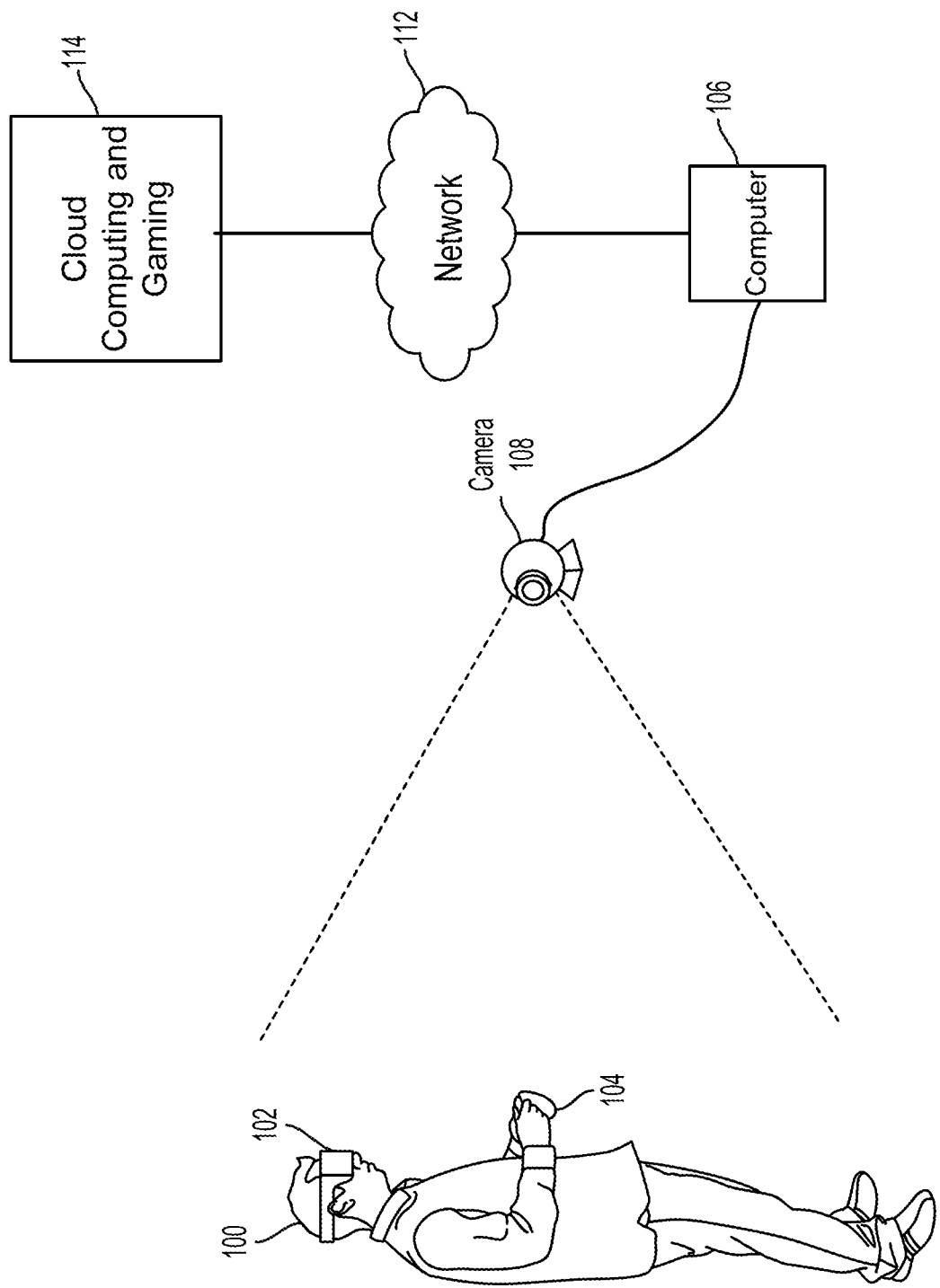
FIG. 1B illustrates another embodiment of a system for interaction with a virtual environment via an HMD, in accordance with implementations of the disclosure.

FIG. 1B illustrates another embodiment of a system for interaction with a virtual environment via an HMD, in accordance with implementations of the disclosure. As illustrated, a user 100 is shown wearing an HMD 102 and operating an interface object 104 to provide input for the video game. In the illustrated implementation, the HMD 102 is wirelessly connected to a computer 106. In other implementations, the HMD 102 is connected to the computer 106 through a wired connection. The computer 106 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 102. In some implementations, the computer 106 is configured to execute any other type of interactive application that provides a virtual space/environment that can be viewed through an HMD. In some implementations, the HMD 102 may also communicate with the computer through alternative mechanisms or channels, such as via a network 112 to which both the HMD 102 and the computer 106 are connected.

As noted above, the user 100 may operate an interface object 104 to provide input for the video game. Additionally, in some embodiments, a camera 108 can be configured to capture images of the physical environment in which the user 100 is located. These captured images can be analyzed to determine the location and movements of the user 100, the HMD 102, and the interface object 104. In various implementations, the interface object 104 includes a light which can be tracked, and/or inertial sensor(s), to enable determination of the interface object's location and orientation and tracking of movements.

In some implementations, the interface object 104 is tracked relative to the HMD 102. For example, the HMD 102 may include an externally facing camera that captures images including the interface object 104. The captured images can be analyzed to determine the location/orientation of the interface object 104 relative to the HMD 102, and using a known location/orientation of the HMD, to determine the location/orientation of the interface object 104 in the local environment.

The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the physical environment in which the user 100 is located. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some implementations, the HMD 102, interface object 104, and camera 108, may themselves be networked devices that connect to the network 112, for example to communicate with the cloud computing and gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figures 2, 2A:
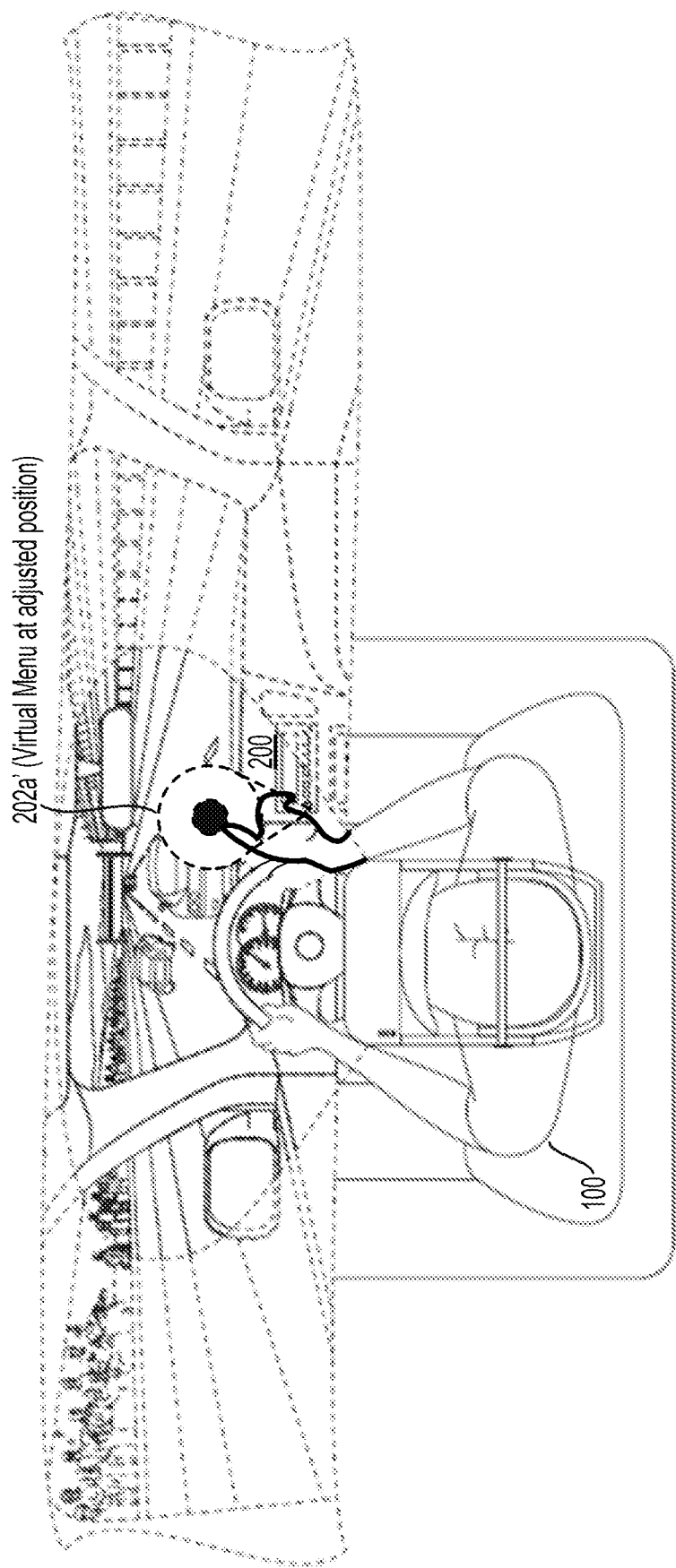
Figures 1, 2B:
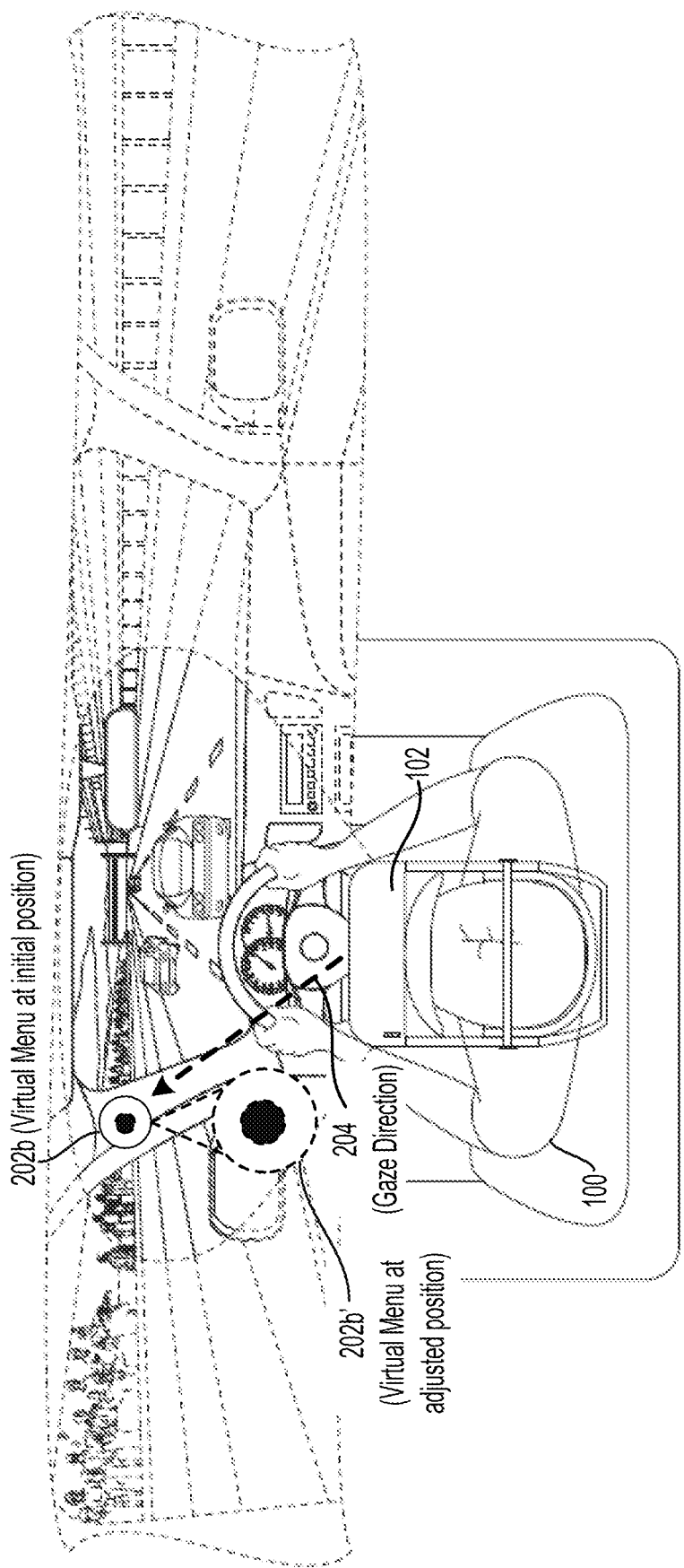
Figures 2, 2B:
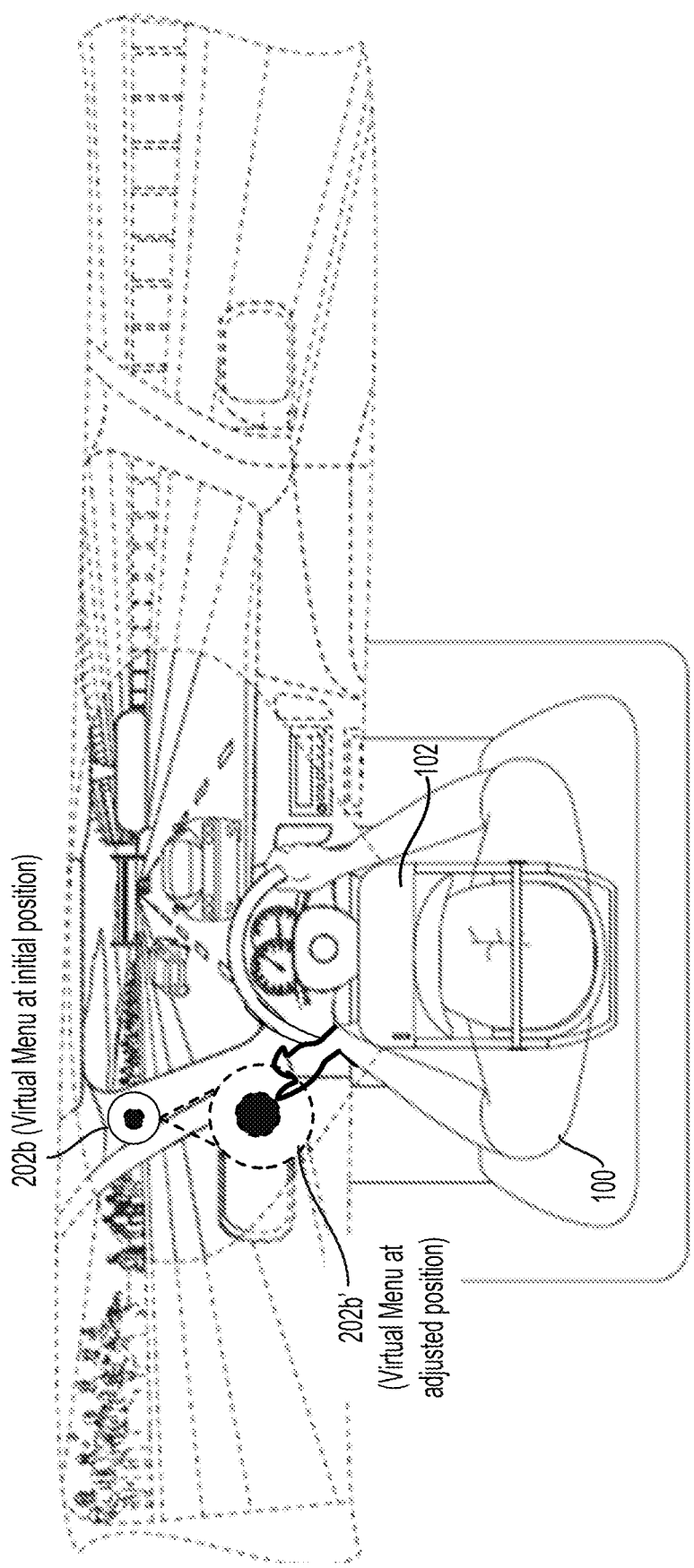

FIG. 2A-1 illustrates an embodiment of a view into a virtual environment of a user 100 showing a virtual menu 202a that is moved from an initial virtual position (e.g., 202a) to an adjusted virtual position (202a'). In the illustrated example, the user 100 is shown wearing an HMD 102 while playing a virtual reality racing video game. During the gameplay, the user 100 is driving a virtual race car and racing against other race cars in the virtual environment. In one embodiment, a camera can be used to monitor the physical actions of the user while the user is wearing the HMD and interacting with the virtual reality scene during the gameplay. For example, the physical actions of the user may include body movements of the user, voice output of the user, gaze direction of the user, gesture of the user, etc.

In one embodiment, the camera used to monitor the physical actions of the user can be an externally facing camera located on the HMD 102 that is configured to capture images of the local environment of the user 100 and the interface object 104. As noted above, the images captured by the externally facing camera can be analyzed to determine the location/orientation of the interface object 104 relative to the HMD 102. Using the known location/orientation of the HMD, the interface object 104, and inertial sensor data from the HMD and interface object 104, the physical actions and movements of the user can be continuously monitored and tracked during the gameplay.

As further illustrated in FIG. 2A-1, the system is configured to identify an attempt by the user 100 to make an input at the virtual menu 202a in the virtual reality scene based on the physical actions of the user. For example, as shown in FIG. 2A-1, the gaze direction 204 of the user 100 is directed toward a car stereo panel 200 which is located at an initial virtual position. In some embodiments, a gaze tracking camera in the HMD 102 may be configured to capture images of the eyes of the user 100 to determine the gaze direction of the user 100 and the specific game content that the user 100 is focused on. Accordingly, based on the physical actions (e.g., glancing at car stereo panel 200, moving arm toward car stereo panel 200, etc.) such as the gaze direction 204 of the user 100, the system may determine that the user 100 is attempting to make an input at the virtual menu 202a. In the illustrated example, the gaze direction 204 of the user 100 is focused on the "power button" of the car stereo panel 200.

As further illustrated in in FIG. 2A-1, the system is configured to generate a movement of the virtual menu 202a from an initial virtual position (e.g., 202a) in the virtual reality scene to an adjusted virtual position (202a') in the virtual reality scene. For example, as shown in FIG. 2A-1, the virtual menu 202a (e.g., "power button") is moved from an initial virtual position (e.g., 202a) to an adjusted virtual position (e.g., 202a'). In one embodiment, the virtual menu 202a is moved to a virtual position that is accessible by the user 100. In other embodiments, the virtual menu 202a is moved to a location that is preferred by the user 100. In the illustrated example, the virtual menu 202a is moved to a virtual position that appears closer and is more accessible to the user because the system determined that the user 100 is unable to reach the virtual menu 202a at its initial virtual position.

FIG. 2A-2 illustrates an embodiment of the virtual environment of user 100 shown in FIG. 2A-1 illustrating the user 100 providing an input at the virtual menu 202a, e.g., pushing power button to turn on the car stereo system. As noted above, the virtual menu is moved to an adjusted virtual position which can be accessible by the user. In some embodiments, the movement of the virtual menu to the adjusted virtual position (e.g., 202a') is based on a model of interactivity of the user. For example, during the gameplay of the user 100, the model of interactivity can receive as inputs a profile of the user, the physical actions of the user, and gameplay data. Using the noted inputs, the model of interactivity can be used to determine that the user 100 wants to turn on the car stereo but is unable to do so because the range of motion of the arms of the user is limited to a distance more proximate to the user. Accordingly, the system can use the model of interactivity to predict the location of the adjusted virtual position of the virtual menu 202a which can be accessible by the user 100. In one embodiment, after the user 100 selects the power button to turn on the car stereo system, the virtual menu 202a is configured to return to its initial virtual position.

In some embodiments, to minimize a false selection of the virtual menu, when a user selects a virtual menu, haptic feedback may be provided to the user to confirm the selection of the virtual menu. For example, the selected virtual menu may vibrate, pulse or glow in response to the user selecting the virtual menu and providing input. In some embodiments, the virtual menu may be selected based on an oral input by the user. For example, to turn on the car stereo system shown in FIG. 2A-2, the user may gaze at the virtual menu 202a' and assert "turn on the radio."

FIG. 2B-1 illustrates another embodiment of a view into a virtual environment of a user 100 showing a virtual menu 202b that is moved from an initial virtual position (e.g., 202b) to an adjusted virtual position (202b'). In the illustrated example, the virtual menu 202b can be a menu that is configured to receive an input from the user 100 to initiate a feature in the car such as initiating turbo mode, initiating cruise control, turning on the air conditioner, turning on the radio, adjusting the window tint, etc. As illustrated, the gaze direction 204 of the user 100 is directed toward the virtual menu 202b which is located at its initial virtual position. Since the system monitors the gaze direction and the physical actions of the user, the system may determine that the user is attempting to make an input at the virtual menu 202b. Accordingly, the system can generate a movement of the virtual menu 202b from its initial virtual position (e.g., 202b) to an adjusted virtual position (e.g., 202b') that is accessible by the user 100.

FIG. 2B-2 illustrates an embodiment of the virtual environment of user 100 shown in FIG. 2B-1 illustrating the user 100 providing an input at the virtual menu 202b, e.g., pushing the turbo button to initiate turbo mode. As noted above, the virtual menu 202b is moved to an adjusted virtual position that is accessible by the user. In the example shown in FIG. 2B-1, the virtual menu 202b is moved to a virtual position proximate to the left hand of the user so that the user can provide input at the virtual menu 202b'. In other embodiments, the shape and the visual appearance of the virtual menu can be adjusted based on the preferences of the user. For example, the magnitude, shape, size, fonts, colors, etc. associated with the virtual menu can be adjusted based on a prediction of what the user might prefer. Once the user 100 selects the virtual menu to initiate the "turbo mode" feature, the virtual race car of the user accelerates and the virtual menu returns to its initial virtual position.

Figure 3:
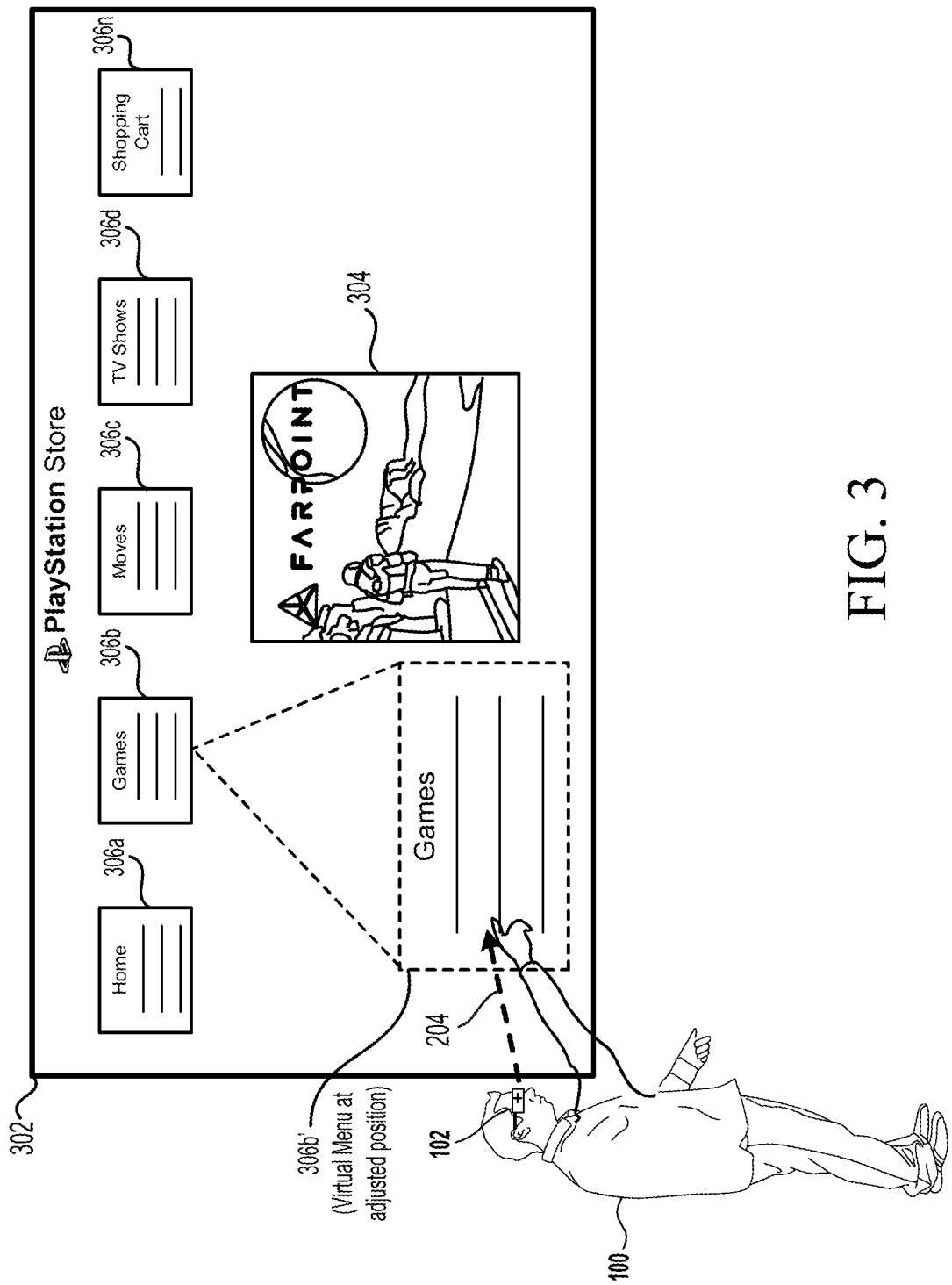
FIG. 3 illustrates an embodiment of a view into a virtual environment of a user showing the user interacting with a virtual reality scene while wearing an HMD, in accordance with implementations of the disclosure.

FIG. 3 illustrates an embodiment of a view into a virtual environment 302 of a user 100 showing the user 100 interacting with a virtual reality scene while wearing an HMD 102. In the illustrated example, the display 302 of the HMD 102 shows a virtual reality scene of an online game store, e.g., PlayStation Store. The online game store includes various content item menus 306a-306n that are selectable by the user 100. For example, as illustrated, the content item menu may include a home content menu 306a, a games content menu 306b, a movies content menu 306c, a TV shows content menu 306d, and a shopping cart content menu 306n. As further illustrated, the virtual reality scene may include a game preview 304 that provides a thumbnail image of the presently selected item. It should be understood that the virtual reality scene may take on various forms and layouts, and this illustration is provided to show the interactive nature of virtual reality environment of a user 100.

In some embodiments, while the user 100 interacts with the virtual reality scene, the physical actions of the user 100 are monitored and tracked. In one example, the gaze direction of the user 100 may be directed toward the games content menu 306b to indicate that the user is interested in exploring the list of games that are available in the games content menu 306b. Further, the physical actions of the user 100 may indicate that the user is attempting to raise their arm to select the games content menu 306b but is unsuccessful because the games content menu 306b is beyond the user's range of motion. Accordingly, as illustrated in FIG. 3, the system is configured to generate a movement of a virtual menu (e.g., games content menu 306b) in the virtual reality scene to an adjusted virtual position (e.g., 306b') that is based on the user's ability. After moving the games content menu 306b to the adjusted position (e.g., 306b'), the user can interact with the games content menu 306b and make any desired selection and input. In some embodiments, after the user 100 makes the desired selections on the games content menu, the games content menu is configured to return to its initial virtual position.

In other embodiments, the system may be configured to continuously track and monitor the position of the user's hands. In one embodiment, since the hands of the user are tracked, the various content item menus 306a-306n can be dynamically moved to a position that is proximate to the hands of the user so that the user can efficiently access the content item menus 306a-306n. In this way, wherever the user moves their hands, the content item menus 306a-306n can be accessible by the user.

In other embodiments, the example shown in FIG. 3 may be an embodiment of a user 100 interacting in an augmented reality (AR) environment. In one embodiment, the user may be wearing AR HMD (e.g., 102) that is configured to render scenes of the AR based environment. In one embodiment, the AR environment may include both real-world objects (not shown) and virtual objects (e.g., content item menus 306a-306n). In one embodiment, the user 100 may be able to move and place any of the virtual objects (e.g., content item menus 306a-306n, game preview 304) at any position within the AR environment. For example, as illustrated in FIG. 3, the user 100 may have muscle soreness or a disability in their arm and reaching the game content menu 306b is uncomfortable for the user. Accordingly, the user 100 can use their hand to pinch the game content menu 306b and move it to a more desirable location. Once the game content menu 306b is moved to the new position, the user 100 can un-pinch their hand to place the menu at the new position. As a result, since the virtual objects can be moved and placed at any position in the AR environment, the user may have a more positive experience interacting in the AR environment because the user will no longer have to struggle to reach in certain directions that would make it uncomfortable for the user.

In one embodiment, some AR business apps require users to use the pinch/carry/drop gesture to move windows around a virtual workspace. For example, the user moves his fingers to pinch a window, then move the arm to a new location (i.e., the window follows), then un-pinch to drop the window in the new location. In other embodiments, a user may "summon" a menu to wherever their hand might be. This way, no matter where the hand is located, the menu is always within reach. In one embodiment, this functionality may require tracking the current position of the hand, and moving the menu to that position when the menu is invoked.

FIG. 4A illustrates an embodiment of a view into a virtual environment 401 of a user 100 showing the user 100 interacting with a virtual reality scene while wearing an HMD 102. As the user 100 holds an interface object (not shown) or uses their arms and hands to interact with the virtual reality scene, the user's arms and hands may appear to extend into the virtual reality scene rendered in the screen 302 of the HMD 102. The position of the user's hands can be detected and can be shown to enter the screen 302 of the HMD 102 as if the user 100 was extending their hand into the interactive scene.

For example, in the illustration shown in FIG. 4A, a user 100 is shown extending their arm and hands into the virtual reality scene. In particular, the virtual reality scene includes a rendering of a virtual arm 402a and virtual hand 403a of the user 100 holding a virtual gun 404 which is aimed toward a game character 408. As shown, the gaze direction 204 of the user is directed toward an upper portion of the game character 408 which can provide an indication that the user is attempting to aim at the upper portion of the game character 408. However, after monitoring the physical actions of the user, the system may determine that the user is unable to raise their arm to a position that allows the virtual gun 404 to be aimed at the intended target, e.g., upper portion of the game character 408. As a result, the user 100 is unable to aim the virtual gun 404 at the intended target and instead, the gun direction 410a is directed toward a lower portion of the game character 408, e.g., target location 406a.

FIG. 4B illustrates an embodiment of the virtual environment of user 100 shown in FIG. 4A showing the user 100 interacting with a virtual reality scene where the virtual arm 402b and virtual hand 403b of the user are rendered at an adjusted position to assist the user aim at the intended target location 406b. As noted above with respect to FIG. 4A, the user is unable to raise their arm to a position that allows the virtual gun 404 to be aimed at the intended target. Accordingly, in one embodiment, the system may render the user's arms and hands at an adjusted virtual position based on the physical actions of the user to enable the user provide input at the virtual object, e.g., aiming and shooting at intended target location 406b.

For example, as illustrated in FIG. 4B, the gaze direction 204 of the user is directed toward an upper portion of the game character 408 which may indicate that the user intends to aim and shoot at the upper portion of the game character 408. The virtual arm 402b and the virtual hand 403b of the user are rendered at an adjusted virtual position (e.g., above the user's shoulder) compared to the virtual arm 402a and virtual hand 403a shown in FIG. 4A. The adjusted virtual position of the virtual arm 402b and the virtual hand 403b enables gun direction 410b to be directed toward the intended target location 406b so that the user can accurately shoot at the target. As a result, the rendering of the user's arms and hands may be rendered at an adjusted virtual position while still making it appear realistic for the user that the virtual arm 402a and virtual hand 403a are an extension of their real arm and hand.

Figure 5A:
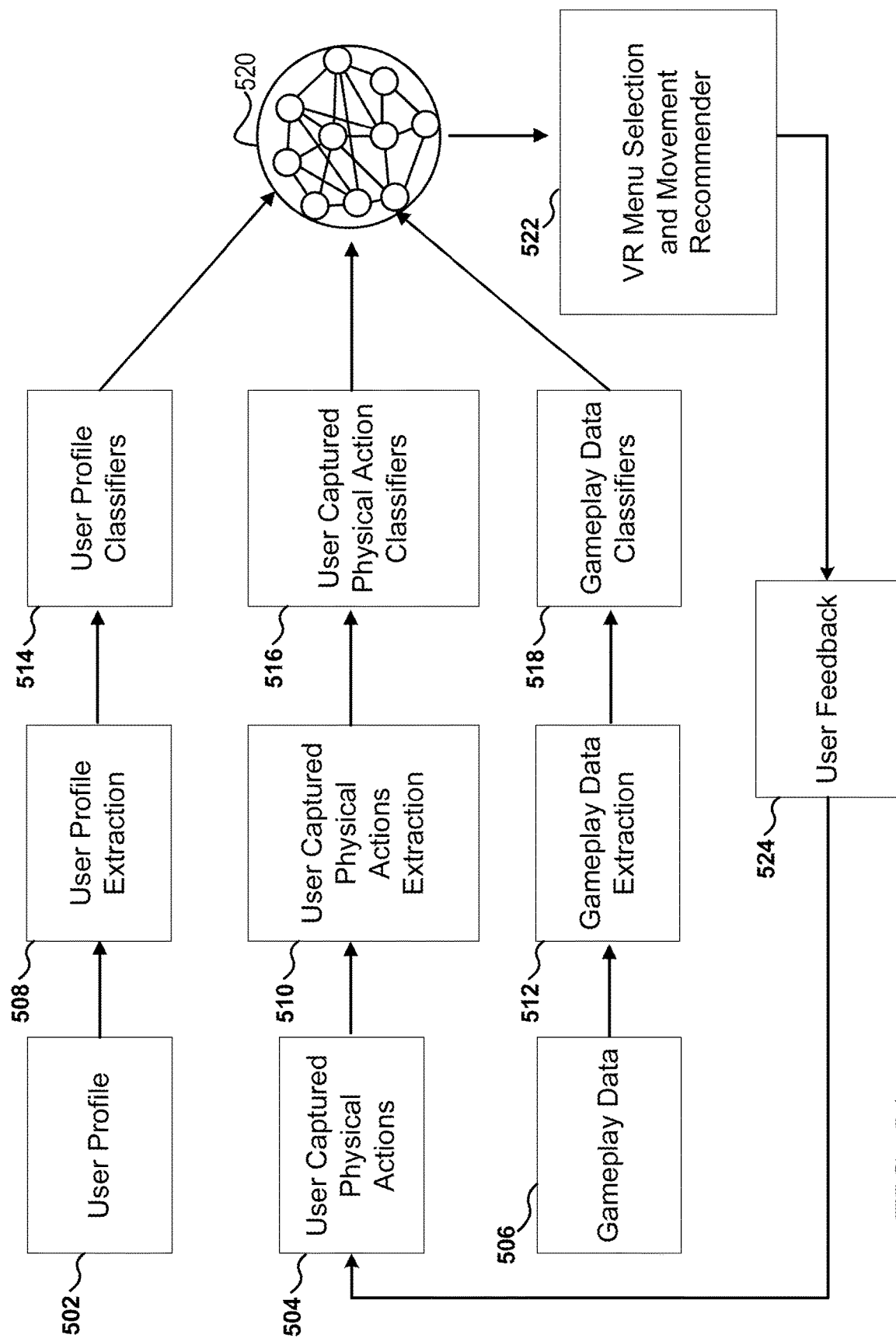
FIG. 5A illustrates an embodiment of a method for using a model of interactivity to dynamically determine a movement of a virtual menu using a user profile, user captured physical actions, and gameplay data as inputs, in accordance with implementations of the disclosure.

FIG. 5A illustrates an embodiment of a method for using a model of interactivity 520 to dynamically determine a movement of a virtual menu using a user profile 502, user captured physical actions 504, and gameplay data 506 as inputs. As noted above, the virtual menu can be moved from an initial virtual position to an adjusted virtual position. In this way, the virtual menu is moved to a position that is accessible by the user or to a position that is preferred by the user 100.

As shown in FIG. 5A, in one embodiment, the system may include feature extraction operations (e.g., 508, 510, 512) that are configured to identify various features in the user profile 502, the user captured physical actions 504, and the gameplay data 506. After the feature extraction operations identifies the features associated with the inputs, classifier operations (e.g., 514,516, 518) may be configured to classify the features using one or more classifiers. In some embodiments, the system includes a model of interactivity 520 of the user that is configured to receive the classified features from the classifier operations. Using the classified features, the model of interactivity 520 can be used to recommend and predict one or more virtual menus to move and the adjusted virtual position of the one or more virtual menus. In some embodiments, operation 522 can use the model of interactivity 520 to determine which virtual menu to select for movement to the adjusted virtual position. In another embodiment, a user feedback 524 operation can be configured to capture the feedback of the user which can be incorporated into the user captured physical actions 504.

In one embodiment, the system can process the user profile 502. The user profile 502 may include various attributes and information associated with user 100 such as physical attributes, current and previous physical mobility, gameplay tendencies, specialized gaming skills, gaming skill level, gaming experience, preferences, interests, disinterests, etc. In some embodiments, the user profile extraction 508 operation is configured to process the user profile 502 to identify and extract features associated with the profile of the user 100. After the user profile extraction 508 operation processes and identifies the features from the user profile 502, the user profile classifiers 514 operation is configured to classify the features using one or more classifiers. In one embodiment, the features are labeled using a classification algorithm for further refining by the model of interactivity 520.

In another embodiment, the system can process the user captured physical actions 504. As noted above, the physical actions of the user are continuously monitored and tracked during the gameplay of the user. In one embodiment, the user captured physical actions 504 may include various attributes and information associated with the game actions of the user such as body movement data, eye gaze data, voice capture data, face capture data, and controller input data. For example, a user with a shoulder injury caused by a car accident is undergoing physical therapy. The body movement data may provide information that the user has a 25-degree arm angle flexion from a neutral position. As time progresses and the user recovers from the shoulder injury, the system may track and determine the arm angle flexion at any point in time and its progression based on monitoring the physical actions of the user during gameplay. Accordingly, the user captured physical actions 504 can be used to help predict a virtual location to place a virtual menu as the user recovers from the injury and the arm angle flexion of the user improves.

In some embodiments, the user captured physical actions extraction 510 operation is configured to process the user captured physical actions 504 to identify and extract features associated with the physical actions of the user. After the physical actions extraction 510 operation processes and identifies the features from the user captured physical actions 504, the user captured physical actions classifier 516 operation is configured to classify the features using one or more classifiers. In one embodiment, the features are labeled using a classification algorithm for further refining by the model of interactivity 520.

In another embodiment, the system can process the gameplay data 506. In one embodiment, the gameplay data 506 may include a variety of information associated with the video game that is being played by the user 100 such as the scenes in the video game, progression in the video game, points scored, contextual data regarding the scenes in the video game, metadata, etc. In one embodiment, the gameplay data extraction 512 operation is configured to process the gameplay data 506 to identify and extract features associated with the gameplay of the user. After the gameplay data extraction 512 processes and identifies the features from the gameplay data 506, the gameplay data extraction classifiers 518 operation is configured to classify the features using one or more classifiers. In some embodiments, the features are labeled using a classification algorithm for further refining by the model of interactivity 520.

In some embodiments, the model of interactivity 520 is configured to receive as inputs the classified features (e.g., user profile classified features, user captured physical actions classified features, gameplay data classified features). In another embodiment, other inputs that are not direct inputs or lack of input/feedback, may also be taken as inputs to the model of interactivity 520. The model of interactivity 520 may use a machine learning model to predict one or more virtual menus to move and its corresponding adjusted virtual position. For example, a user profile 502 associated with a user playing a racing game may indicate that a user has tendency to initiate the "turbo mode" feature when driving along a straightaway portion of a race track. Further, based on the user captured physical actions 504 associated with the user, the system may determine that the user is unable to reach the virtual menu to initiate the "turbo mode" feature. Accordingly, using the user profile, user captured physical actions, and the gameplay data, the model of interactivity 520 may be used to predict the movement of the virtual menu related to the "turbo mode" feature to a location closer to the user when the user is driving along the straightaway portion of a race track.

In some embodiments, operation 522 can use the model of interactivity 520 to determine which virtual menu to select for moving from its initial virtual position to the adjusted virtual position in the virtual reality scene. Once the virtual menu is selected, the virtual menu is moved to the adjusted virtual position to allow the user 100 to provide input at the virtual menu. In some embodiments, while the user is playing the video game and immersed in the virtual reality environment, the system can continuously select other virtual menus to move based on the continuous processing of the user profile, user captured physical actions, and gameplay data.

In some embodiments, the user feedback 524 operation can be configured to assess the user's response to the selected virtual menu and its placement at the adjusted virtual position. The feedback may be explicit or implied by the user. For example, if a virtual menu is moved to an adjusted virtual position and is ignored by the user, it may be implied that the user is not interested in the virtual menu. In another example, if the user attempts to raise their arm to engage with the virtual menu at the adjusted position but is unsuccessful, it may be implied that the user is interested in the content but is unable to reach it. Accordingly, various inferences can be captured by the user feedback 524 operation and incorporated into the user captured physical actions 504 and user profile 502 which can help provide a more accurate selection and movement of the virtual menu.

FIG. 5B illustrates an embodiment of a user captured physical actions table 526 illustrating various physical actions that are captured during the gameplay of the user. As shown, the user captured physical actions table 526 includes a physical action category 528 and a general description 530. In one embodiment, the physical action category 528 may include information associated with the user that is captured during the gameplay such as body movement data, eye gaze data, voice capture data, face capture data, controller input data, etc.

To provide an illustration of the user captured physical actions table 526 in FIG. 5B, in one example, the system may determine that based on the gameplay data, the user is playing a shooting video game. Using the user captured physical actions table 526, the body movement data indicates that the user is unable to extend their arm laterally beyond 30-degrees from a neutral position. Based on the body movement data and the gameplay data, the system may move the shooting target (e.g., virtual menu) to an adjusted virtual position that is within range of motion of the user's arm so that the user can properly aim at the shooting target. Accordingly, the virtual menus in the video game can be moved and placed at a virtual location based on the physical ability of the user so that the user can have a fair chance in progressing in the gameplay.

Figure 6A:
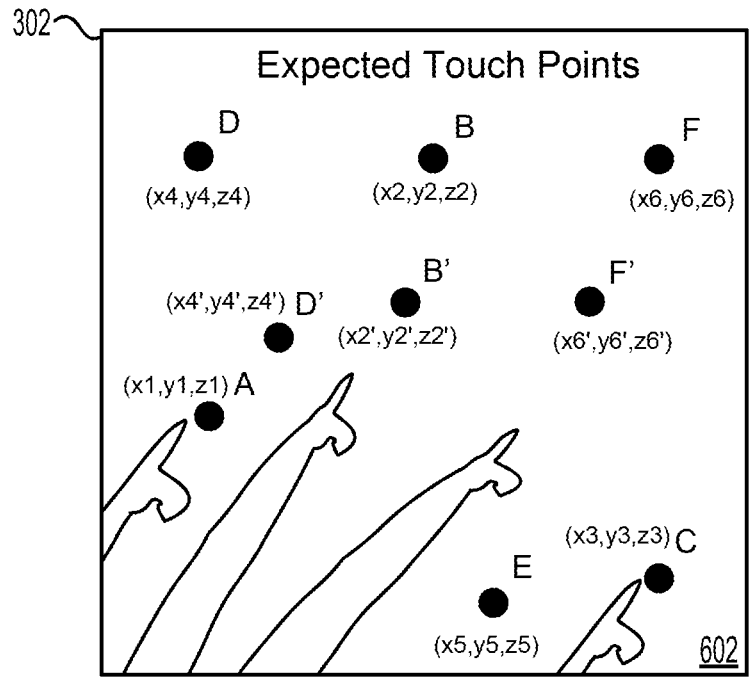
FIGS. 6A-6B show an embodiment of a calibration process that is performed to determine the physical actions of the user, in accordance with implementations of the disclosure.
Figure 6B:
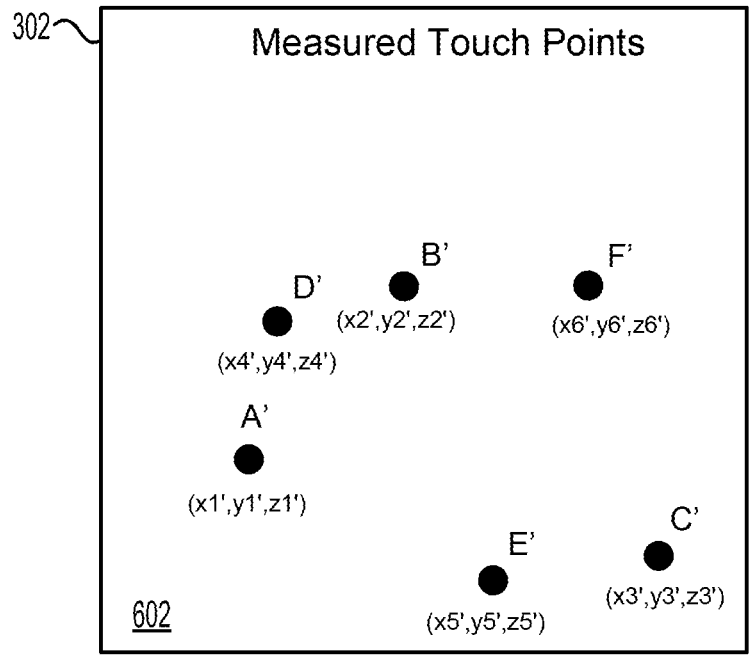

FIGS. 6A-6B show an embodiment of a calibration process that is performed to determine the physical actions of the user. As shown in FIG. 6A, various expected touch points A-F are presented on the display 302 of the HMD. In one embodiment, the calibration process may include the user 100 extending their hand (right hand and left hand) and touching the various expected touch points A-F. Each expected touch point may have a corresponding three-dimensional (3D) location data within the virtual environment 602, e.g., x1, y1, z1, etc. In some embodiments, the calibration process may help determine various physical actions associated with the user such as the user's range of motion, reach direction, reach distance, etc.

For example, as shown on the display 302 in FIG. 6A, when the user attempted to reach toward touch point D (e.g., x4, y4, z4), the user was unsuccessful which resulted in the user only being able to reach out toward measured touch point D' (e.g., x4', y4', z4'). Accordingly, the measured touch points may provide various information related to the physical limitations of the user which can be processed and used to determine where to move a virtual menu within the virtual reality scene. As shown in FIG. 6B, the results of the calibration process are shown on the display 302 of the HMD. The measured touch points A'-F' correspond to the expected touch points A-F shown in FIG. 6A, respectively.

Figure 7:
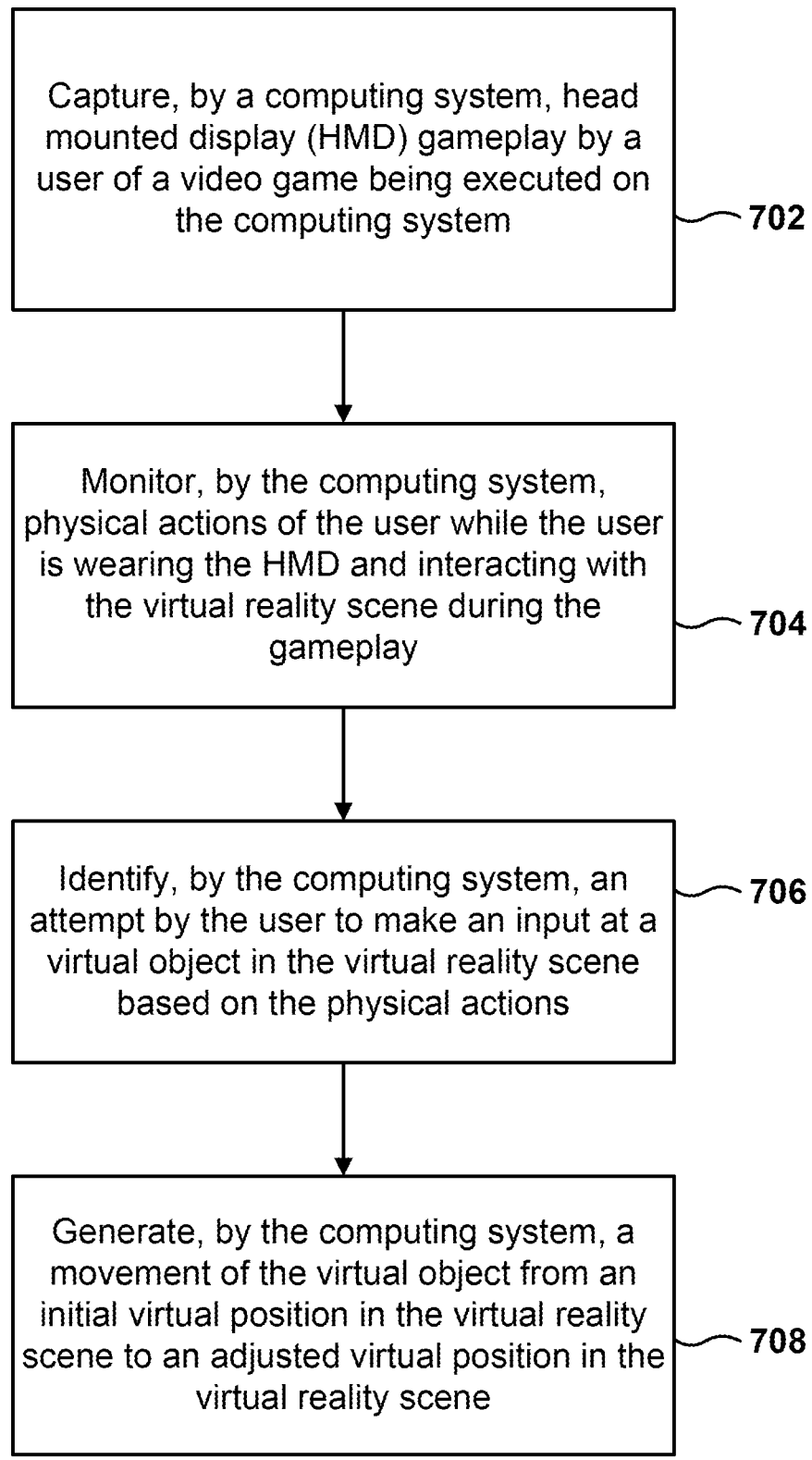
FIG. 7 illustrates a method for placing a virtual menu at an adjusted virtual position of a virtual reality scene, in accordance with implementations of the disclosure.

FIG. 7 illustrates a method for placing a virtual menu at an adjusted virtual position of a virtual reality scene. In one embodiment, the method described in FIG. 7 provides a user with an enhanced gaming experience by moving a virtual menu to an adjusted virtual position that it is accessible by the user or a virtual position that is preferred by the user. In one embodiment, the method includes an operation 702 that is configured to capture, by a computing system, HMD gameplay data 506 produced by a user of a video game being executed on the computing system. The HMD presents virtual reality scene to the user. In one embodiment, the gameplay data 506 is produced by the user 100 during their gameplay and include gameplay metadata such as state data that identifies all of the actions, inputs, and moves made by the user. In some embodiments, the gameplay data 506 may include a variety of information associated with the video game that is played by the user such as the scenes in the video game, progression in the video game, points scored, contextual data regarding scenes in the video game, etc.

The method shown in FIG. 7 then flows to operation 704 where the operation is configured to monitor, by the computing system, physical actions of the user while the user is wearing the HMD and interacting with the virtual reality scene during the gameplay. As noted above, the physical actions of the user can be continuously monitored and tracked during the gameplay using the images captured by the externally facing camera. In another embodiment, the physical actions of the user can be captured by a camera 108 that is directed toward the user. The camera 108 can be configured to capture images of the physical environment in which the user 100 is located and to determine the movements and location of the user 100. As noted above, the physical actions of the user may include various attributes and information associated with the game actions of the user such as body movement data, eye gaze data, voice capture data, face capture data, and controller input data.

The method flows to operation 706 where the operation is configured to identify, by the computing system, an attempt by the user to make an input at a virtual menu (e.g., virtual object) in the virtual reality scene based on the physical actions. For example, a user may be playing a virtual reality game that involves the user playing a virtual guitar. The monitored physical actions of the user may indicate that the user is smiling and expressing a happy facial expression. While playing the guitar, the user continuously looks toward the virtual menu that is related to the volume control. Accordingly, this may indicate that the user is attempting to make an input to adjust the volume control. As a result, operation 706 is configured to identify and monitor such attempts by the user to identify virtual menus that may need to be moved to an adjusted position.

The method shown in FIG. 7 then flows to operation 708 where the operation is configured to generate, by the computing system, a movement of the virtual menu (e.g., virtual object) from an initial virtual position in the virtual reality scene to an adjusted virtual position in the virtual reality scene. As noted above, the movement of the virtual menu is moved to the adjusted virtual position so that the virtual menu can be accessed by the user so that the user can make an input, e.g., select, aim & shoot, score point, etc. In one embodiment, the movement of the virtual menu has a virtual distance and a virtual direction that is predicted for the user based a model of interactivity 520 of the user to enable the input by the user.

In some embodiments, the virtual menu is selected and moved to an adjusted virtual position based on processing the user profile 502, user captured physical actions 504, and gameplay data 605 through the model of interactivity 520 of the user. In one embodiment, the model of interactivity 520 may be initially trained using global features of other HMD users similar to the user 100. Over time, the model of interactivity 520, based on the inputs and physical actions of the user, will be trained more specifically to the user's preferences and dislikes which can be used to predict what virtual menus the user 100 may wish to identify for movement to an adjusted virtual position.

Figures 1, 8A:
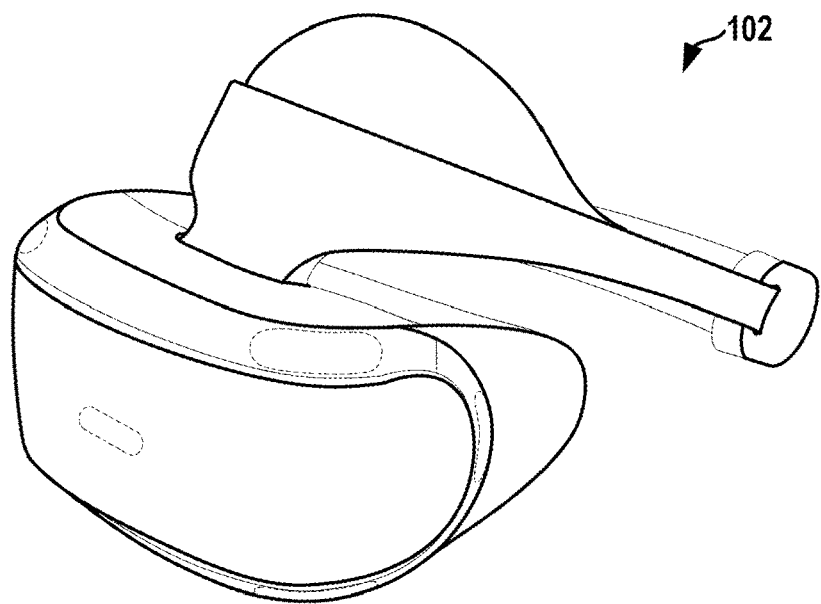
Figures 2, 8A:
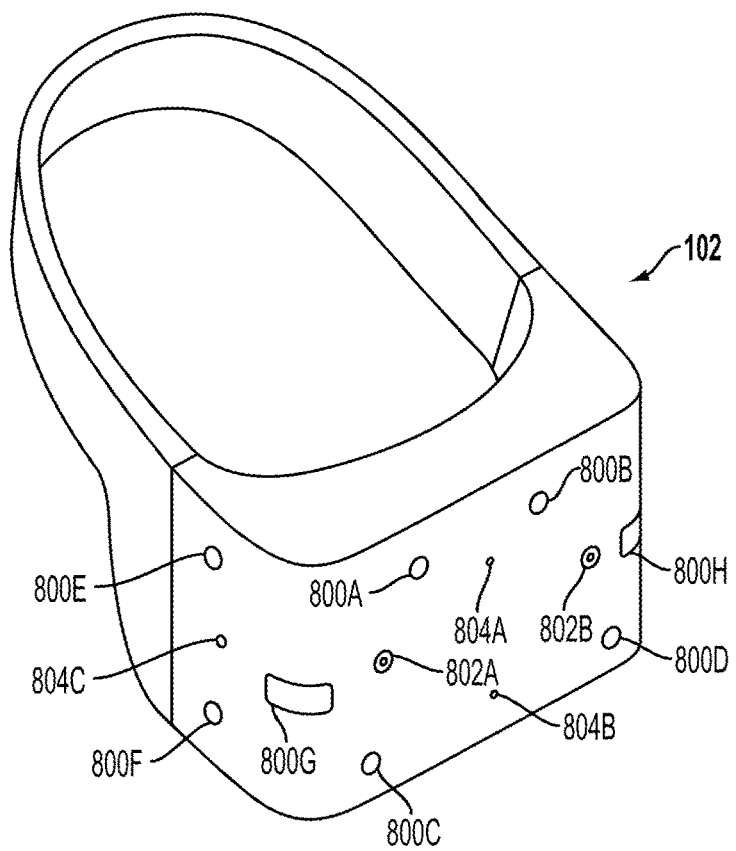

FIGS. 8A-1 and 8A-2 illustrate a head-mounted display (HMD), in accordance with an implementation of the disclosure. FIG. 8A-1 in particular illustrates the Playstation® VR headset, which is one example of a HMD in accordance with implementations of the disclosure. As shown, the HMD 102 includes a plurality of lights 800A-H. Each of these lights may be configured to have specific shapes, and can be configured to have the same or different colors. The lights 800A, 800B, 800C, and 800D are arranged on the front surface of the HMD 102. The lights 800E and 800F are arranged on a side surface of the HMD 102. And the lights 800G and 800H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 800G and 800H) may be exposed for image capture depending upon the orientation of the HMD 102 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated implementation, the HMD 102 includes microphones 804A and 804B defined on the front surface of the HMD 102, and microphone 804C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated implementation, the HMD 102 is shown to include image capture devices 802A and 802B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 802A and 802B (e.g., or one or more external facing (e.g. front facing) cameras disposed on the outside body of the HMD 102) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated implementation, two cameras are shown on the front surface of the HMD 102, it will be appreciated that there may be any number of externally facing cameras installed on the HMD 102, oriented in any direction. For example, in another implementation, there may be cameras mounted on the sides of the HMD 102 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

FIG. 8B illustrates one example of an HMD 102 user 100 interfacing with a client system 106, and the client system 106 providing content to a second screen display, which is referred to as a second screen 807. The client system 106 may include integrated electronics for processing the sharing of content from the HMD 102 to the second screen 807. Other implementations may include a separate device, module, connector, that will interface between the client system and each of the HMD 102 and the second screen 807. In this general example, user 100 is wearing HMD 102 and is playing a video game using a controller, which may also be interface object 104. The interactive play by user 100 will produce video game content (VGC), which is displayed interactively to the HMD 102.

In one implementation, the content being displayed in the HMD 102 is shared to the second screen 807. In one example, a person viewing the second screen 807 can view the content being played interactively in the HMD 102 by user 100. In another implementation, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 807 along with the VGC received from the HMD 102.

Accordingly, the interactivity by other users who may be co-located or remote from an HMD user can be social, interactive, and more immersive to both the HMD user and users that may be viewing the content played by the HMD user on a second screen 807. As illustrated, the client system 106 can be connected to the Internet 810. The Internet can also provide access to the client system 106 to content from various content sources 820. The content sources 820 can include any type of content that is accessible over the Internet.

Such content, without limitation, can include video content, movie content, streaming content, social media content, news content, friend content, advertisement content, etc. In one implementation, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one implementation receive the second screen content from one of the content sources 820, or from a local user, or a remote user.

Figure 9:
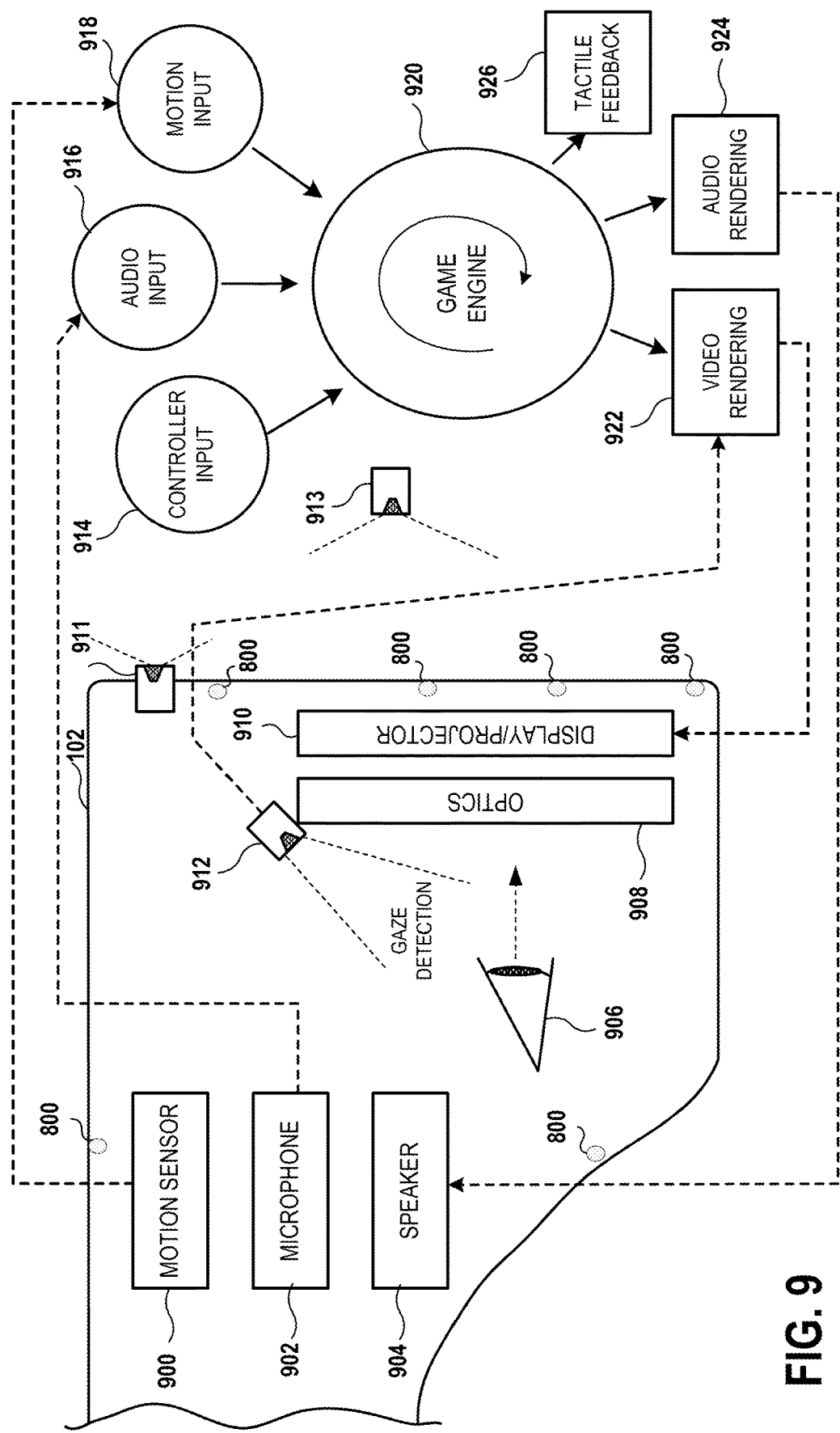
FIG. 9 conceptually illustrates the function of an HMD in conjunction with an executing video game, in accordance with an implementation of the disclosure.

FIG. 9 conceptually illustrates the function of the HMD 102 in conjunction with an executing video game or other application, in accordance with an implementation of the disclosure. The executing video game/application is defined by a game/application engine 920 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 914, audio input 916 and motion input 918. The controller input 914 may be defined from the operation of a gaming controller separate from the HMD 102, such as a handheld gaming controller (e.g. Sony DUALSHOCK®4 wireless controller, Sony PlayStation®Move motion controller) or directional interface object 104. By way of example, controller input 914 may include directional inputs, button presses, trigger activation, movements, gestures, or other kinds of inputs processed from the operation of a gaming controller. In some implementations, the movements of a gaming controller are tracked through an externally facing camera 911 of the HMD 102, which provides the location/orientation of the gaming controller relative to the HMD 102. The audio input 916 can be processed from a microphone 902 of the HMD 102, or from a microphone included in the image capture device 913 or elsewhere in the local environment. The motion input 918 can be processed from a motion sensor 900 included in the HMD 102, and/or from image capture device 913 as it captures images of the HMD 102, and/or from externally facing camera 911 of the HMD 102. The game engine 920 receives inputs which are processed according to the configuration of the game engine to update the game state of the video game. The game engine 920 outputs game state data to various rendering modules which process the game state data to define content which will be presented to the user.

In the illustrated implementation, a video rendering module 922 is defined to render a video stream for presentation on the HMD 102. The video stream may be presented by a display/projector mechanism 910, and viewed through optics 908 by the eye 906 of the user. An audio rendering module 904 is configured to render an audio stream for listening by the user. In one implementation, the audio stream is output through a speaker 904 associated with the HMD 102. It should be appreciated that speaker 904 may take the form of an open air speaker, headphones, or any other kind of speaker capable of presenting audio.

In one implementation, a gaze tracking camera 912 is included in the HMD 102 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 912, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 926 is configured to provide signals to tactile feedback hardware included in either the HMD 102 or another device operated by the user, such as interface object 104. The tactile feedback may take the form of various kinds of tactile sensations, such as vibration feedback, temperature feedback, pressure feedback, etc. The interface object 104 can include corresponding hardware for rendering such forms of tactile feedback.

Figure 10:
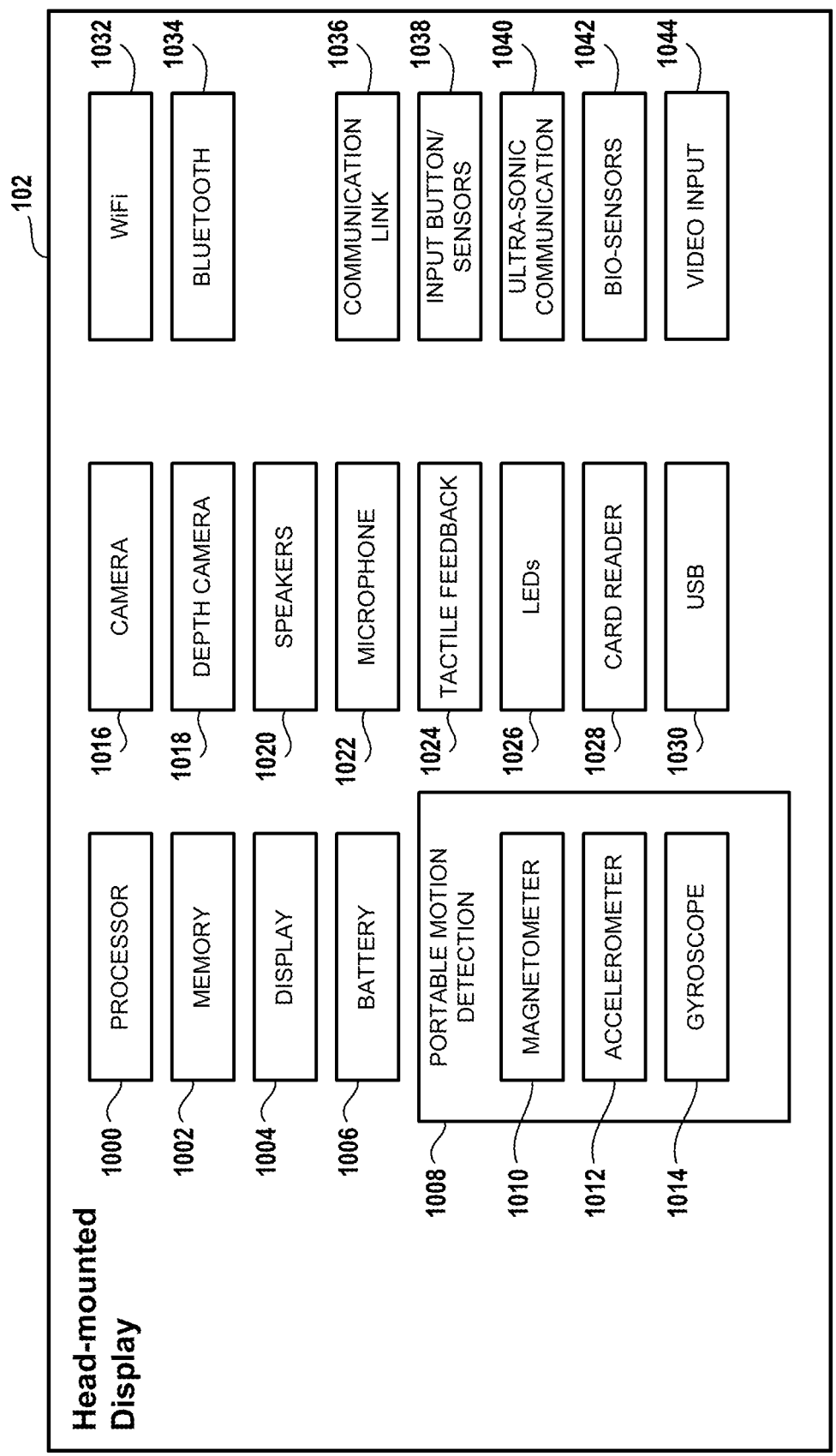
FIG. 10 illustrates components of a head-mounted display, in accordance with an implementation of the disclosure.

With reference to FIG. 10, a diagram illustrating components of a head-mounted display 102 is shown, in accordance with an implementation of the disclosure. The head-mounted display 102 includes a processor 1000 for executing program instructions. A memory 1002 is provided for storage purposes, and may include both volatile and non-volatile memory. A display 1004 is included which provides a visual interface that a user may view. A battery 1006 is provided as a power source for the head-mounted display 102. A motion detection module 1008 may include any of various kinds of motion sensitive hardware, such as a magnetometer 1010, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1012 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1010 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1012 is used together with magnetometer 1010 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1014 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1016 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1018 may be included in the head-mounted display 102 for sensing depth information of objects in a real environment.

The head-mounted display 102 includes speakers 1020 for providing audio output. Also, a microphone 1022 may be included for capturing audio from the real environment, including sounds from the ambient environment, speech made by the user, etc. The head-mounted display 102 includes tactile feedback module 1024 for providing tactile feedback to the user. In one implementation, the tactile feedback module 1024 is capable of causing movement and/or vibration of the head-mounted display 102 so as to provide tactile feedback to the user.

LEDs 1026 are provided as visual indicators of statuses of the head-mounted display 102. For example, an LED may indicate battery level, power on, etc. A card reader 1028 is provided to enable the head-mounted display 102 to read and write information to and from a memory card. A USB interface 1030 is included as one example of an interface for enabling connection of peripheral devices, or connection to other devices, such as other portable devices, computers, etc. In various implementations of the head-mounted display 102, any of various kinds of interfaces may be included to enable greater connectivity of the head-mounted display 102.

A WiFi module 1032 is included for enabling connection to the Internet or a local area network via wireless networking technologies. Also, the head-mounted display 102 includes a Bluetooth module 1034 for enabling wireless connection to other devices. A communications link 1036 may also be included for connection to other devices. In one implementation, the communications link 1036 utilizes infrared transmission for wireless communication. In other implementations, the communications link 1036 may utilize any of various wireless or wired transmission protocols for communication with other devices.

Input buttons/sensors 1038 are included to provide an input interface for the user. Any of various kinds of input interfaces may be included, such as buttons, touchpad, joystick, trackball, etc. An ultra-sonic communication module 1040 may be included in head-mounted display 102 for facilitating communication with other devices via ultra-sonic technologies.

Bio-sensors 1042 are included to enable detection of physiological data from a user. In one implementation, the bio-sensors 1042 include one or more dry electrodes for detecting bio-electric signals of the user through the user's skin.

A video input 1044 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various implementations of the disclosure, the head-mounted display 102 may or may not include some of the various aforementioned components. Implementations of the head-mounted display 102 may additionally include other components not presently described, but known in the art, for purposes of facilitating aspects of the present disclosure as herein described.

Figure 11:
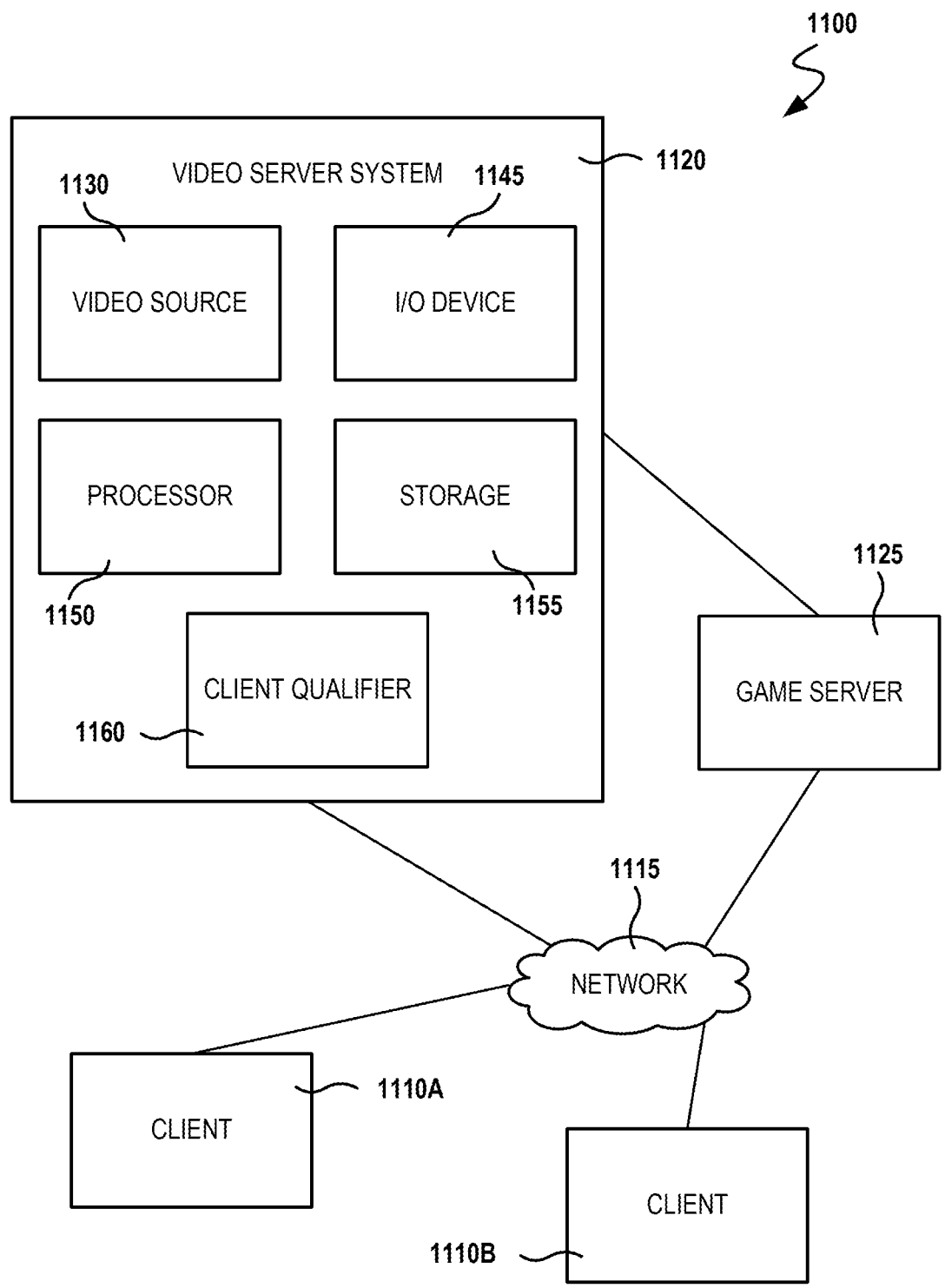
FIG. 11 is a block diagram of a Game System, in accordance with an implementation of the disclosure.

FIG. 11 is a block diagram of a Game System 1100, according to various implementations of the disclosure. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1120 to deliver a game viewed through the HMD. In one implementation, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a Client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some implementations, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some implementations, the game commands are communicated to Game Server 1125 via Video Server System 1120. In some implementations, separate copies of the game commands are communicated from Clients 1110 to Game Server 1125 and Video Server System 1120. The communication of game commands is optionally dependent on the identity of the command Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multi-player game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some implementations, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some implementations, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1130 includes a video recording device such as a camera. This camera may be used to generate delayed or live video that can be included in the video stream of a computer game. The resulting video stream optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In implementations of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In implementations wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some implementations, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some implementations, Client Qualifier 1160 is configured to display images, text, and/or the like within a browser of Client 1110A. In one implementation, Client 1110A is an HMD that includes a browser. In another implementation, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various implementations, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some implementations, Client Qualifier 1160 is configured to determine the characteristics of communication channels between Clients 1110 and more than one instance of Video Server System 1120. In these implementations the information discovered by Client Qualifier can be used to determine which instance of Video Server System 1120 is best suited for delivery of streaming video to one of Clients 1110.

Figure 12:
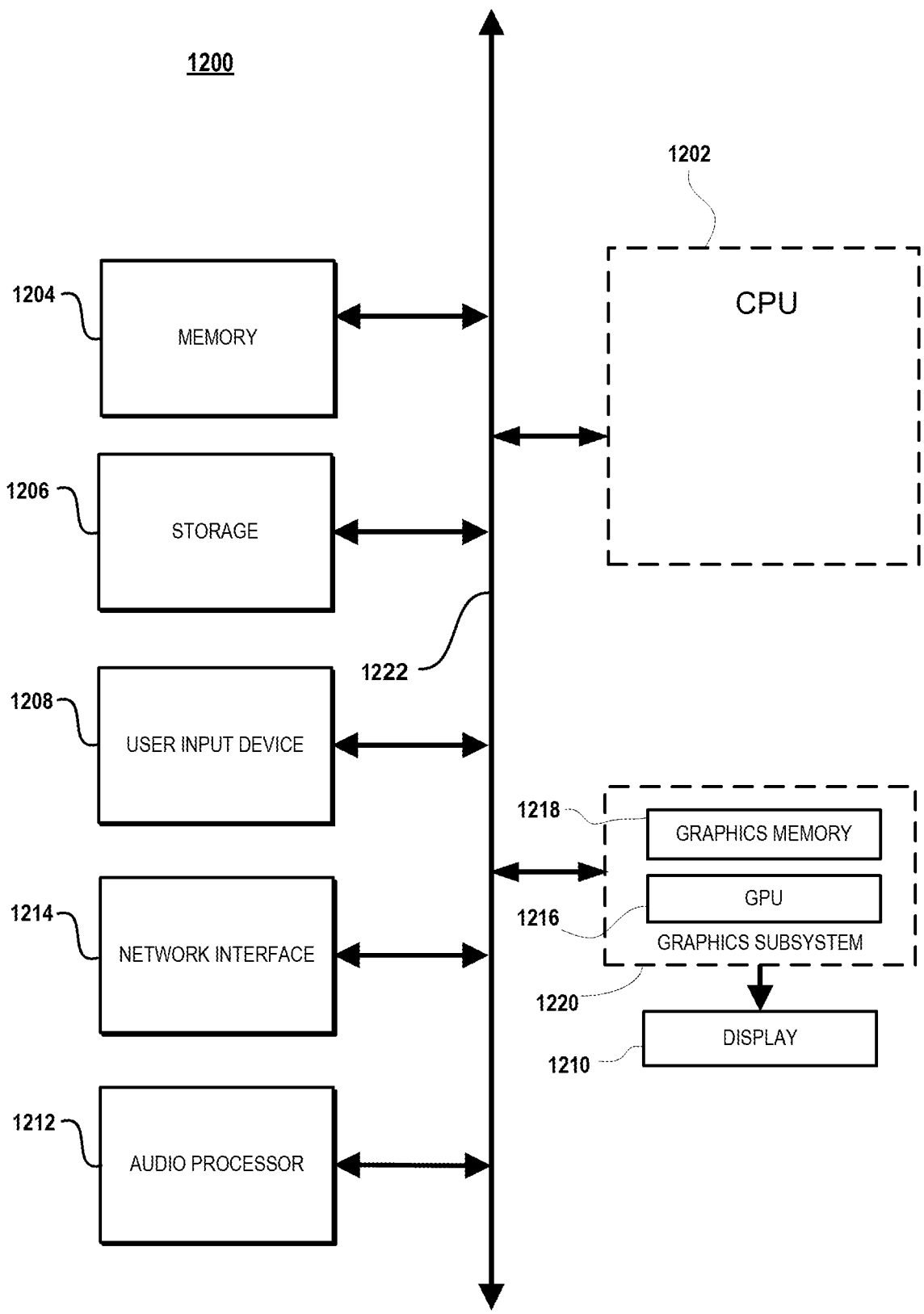
FIG. 12 illustrates components of an example device that can be used to perform aspects of the various embodiments of the present disclosure.

FIG. 12 illustrates components of an example device 1200 that can be used to perform aspects of the various embodiments of the present disclosure. This block diagram illustrates a device 1200 that can incorporate or can be a personal computer, video game console, personal digital assistant, a server or other digital device, suitable for practicing an embodiment of the disclosure. Device 1200 includes a central processing unit (CPU) 1202 for running software applications and optionally an operating system. CPU 1202 may be comprised of one or more homogeneous or heterogeneous processing cores. For example, CPU 1202 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1200 may be a localized to a player playing a game segment (e.g., game console), or remote from the player (e.g., back-end server processor), or one of many servers using virtualization in a game cloud system for remote streaming of gameplay to clients.

Memory 1204 stores applications and data for use by the CPU 1202. Storage 1206 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1208 communicate user inputs from one or more users to device 1200, examples of which may include keyboards, mice, joysticks, touch pads, touch screens, still or video recorders/cameras, tracking devices for recognizing gestures, and/or microphones. Network interface 1214 allows device 1200 to communicate with other computer systems via an electronic communications network, and may include wired or wireless communication over local area networks and wide area networks such as the internet. An audio processor 1212 is adapted to generate analog or digital audio output from instructions and/or data provided by the CPU 1202, memory 1204, and/or storage 1206. The components of device 1200, including CPU 1202, memory 1204, data storage 1206, user input devices 1208, network interface 1210, and audio processor 1212 are connected via one or more data buses 1222.

A graphics subsystem 1220 is further connected with data bus 1222 and the components of the device 1200. The graphics subsystem 1220 includes a graphics processing unit (GPU) 1216 and graphics memory 1218. Graphics memory 1218 includes a display memory (e.g., a frame buffer) used for storing pixel data for each pixel of an output image. Graphics memory 1218 can be integrated in the same device as GPU 1208, connected as a separate device with GPU 1216, and/or implemented within memory 1204. Pixel data can be provided to graphics memory 1218 directly from the CPU 1202. Alternatively, CPU 1202 provides the GPU 1216 with data and/or instructions defining the desired output images, from which the GPU 1216 generates the pixel data of one or more output images. The data and/or instructions defining the desired output images can be stored in memory 1204 and/or graphics memory 1218. In an embodiment, the GPU 1216 includes 3D rendering capabilities for generating pixel data for output images from instructions and data defining the geometry, lighting, shading, texturing, motion, and/or camera parameters for a scene. The GPU 1216 can further include one or more programmable execution units capable of executing shader programs.

The graphics subsystem 1214 periodically outputs pixel data for an image from graphics memory 1218 to be displayed on display device 1210. Display device 1210 can be any device capable of displaying visual information in response to a signal from the device 1200, including CRT, LCD, plasma, and OLED displays. Device 1200 can provide the display device 1210 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method, comprising:
capturing, by a computing system, head mounted display (HMD) gameplay by a user of a video game being executed on the computing system, said HMD presents virtual reality scene to the user;
monitoring, by the computing system, physical actions of the user while the user is wearing the HMD and interacting with the virtual reality scene during the gameplay;
identifying, by the computing system, an attempt by the user to make an input at a virtual object in the virtual reality scene based on the physical actions; and
generating, by the computing system, a movement of the virtual object from an initial virtual position in the virtual reality scene to an adjusted virtual position in the virtual reality scene;
wherein the movement has a virtual distance and a virtual direction that is predicted for the user based a model of interactivity of the user to enable said input with the virtual object.

2. The computer-implemented method of claim 1, wherein the input at the virtual object provided by the user is configured to cause changes in the virtual reality scene.

3. The computer-implemented method of claim 1, wherein the movement of the virtual object to the adjusted virtual position in the virtual reality scene is predicted to be at a virtual location that is preferred by the user.

4. The computer-implemented method of claim 1, wherein the movement of the virtual object to the adjusted virtual position in the virtual reality scene is predicted to be at a virtual position that appears closer to the user.

5. The computer-implemented method of claim 1, wherein the movement of the virtual object to the adjusted virtual position in the virtual reality scene is predicted to be at a virtual location that is accessible by the user.

6. The computer-implemented method of claim 1, wherein the physical actions include voice associated with the user, eye gaze associated with the user, body movement associated with the user, gestures associated with the user, or a combination of two or more thereof.

7. The computer-implemented method of claim 1, wherein at least one of the physical actions identifies a limited range in mobility associated with the user, said limited range in mobility causing an unsuccessful attempt by the user to make the input.

8. The computer-implemented method of claim 1, wherein a hand of the user is represented in the virtual reality scene as a virtual hand, the virtual hand is rendered at a virtual position in the virtual reality scene based on the physical actions of the user to enable said input with the virtual object.

9. The computer-implemented method of claim 1, wherein the virtual object returns to the initial virtual position in the virtual reality scene subsequent to the user providing input with the virtual object.

10. The computer-implemented method of claim 1, wherein the movement of the virtual object is further based on processing on one or more feedback inputs from the user.

11. The computer-implemented method of claim 1, wherein the movement of the virtual object is based on processing a profile of the user, the physical actions of the user, and gameplay data through the model of interactivity of the user, the model of interactivity is configured to identify features from the profile of the user, the physical actions of the user, and the gameplay data to classify attributes of the user, the attributes of the being used to predict the adjusted virtual position.

12. The computer-implemented method of claim 1, wherein the physical actions of the user are determined based on an initial calibration, said initial calibration providing a range of mobility associated with the user.

13. The computer-implemented method of claim 1, wherein the monitoring the physical actions of the user further includes:
monitoring body movements of the user with sensor data obtained by sensors in the HMD.

14. The computer-implemented method of claim 1, further including:
providing haptic feedback to the user in response to the user providing input with the virtual object.

15. A non-transitory computer-readable storage medium storing a computer program, the computer-readable storage medium comprising:
program instructions for capturing head mounted display (HMD) gameplay by a user of a video game being executed on the computing system, said HMD presents virtual reality scene to the user;
program instructions for monitoring physical actions of the user while the user is wearing the HMD and interacting with the virtual reality scene during the gameplay;
program instructions for identifying an attempt by the user to make an input at a virtual object in the virtual reality scene based on the physical actions; and
program instructions for generating a movement of the virtual object from an initial virtual position in the virtual reality scene to an adjusted virtual position in the virtual reality scene;
wherein the movement has a virtual distance and a virtual direction that is predicted for the user based a model of interactivity of the user to enable said input with the virtual object.

16. The storage medium as recited in claim 15, wherein the input at the virtual object provided by the user is configured to cause changes in the virtual reality scene.

17. The storage medium as recited in claim 15, wherein the movement of the virtual object to the adjusted virtual position in the virtual reality scene is predicted to be at a virtual location that is accessible by the user.

18. The storage medium as recited in claim 15, wherein at least one of the physical actions identifies a limited range in mobility associated with the user, said limited range in mobility causing an unsuccessful attempt by the user to make the input.

19. The storage medium as recited in claim 15, wherein the movement of the virtual object is based on processing a profile of the user, the physical actions of the user, and gameplay data through the model of interactivity of the user, the model of interactivity is configured to identify features from the profile of the user, the physical actions of the user, and the gameplay data to classify attributes of the user, the attributes of the being used to predict the adjusted virtual position.

20. The storage medium as recited in claim 15, wherein a hand of the user is represented in the virtual reality scene as a virtual hand, the virtual hand is rendered at a virtual position in the virtual reality scene based on the physical actions of the user to enable said input with the virtual object.

21. The computer-implemented method of claim 1, wherein the HMD is an augmented reality (AR) HMD, said AR HMD presents real-world objects and the virtual object.

22. The storage medium as recited in claim 15, wherein the HMD is an augmented reality (AR) HMD, said AR HMD presents real-world objects and the virtual object.

\* \* \* \* \*